(12) United States Patent
Kohn

(10) Patent No.: US 9,988,780 B2
(45) Date of Patent: Jun. 5, 2018

(54) MATERIAL SPREADING SYSTEMS AND METHODS

(71) Applicant: Apply Right, LLC, Belgium, WI (US)

(72) Inventor: Nathan Benjamin Kohn, Belgium, WI (US)

(73) Assignee: Apply Right, LLC, Belgium, WI (US)

( * ) Notice: Subject to any disclaimer, the term of this patent is extended or adjusted under 35 U.S.C. 154(b) by 116 days.

(21) Appl. No.: 15/136,592

(22) Filed: Apr. 22, 2016

(65) Prior Publication Data
US 2016/0312423 A1 Oct. 27, 2016

Related U.S. Application Data

(60) Provisional application No. 62/151,558, filed on Apr. 23, 2015.

(51) Int. Cl.
*B05B 17/04* (2006.01)
*E01H 10/00* (2006.01)
(Continued)

(52) U.S. Cl.
CPC ......... *E01H 10/007* (2013.01); *A01C 15/003* (2013.01); *A01C 15/006* (2013.01);
(Continued)

(58) Field of Classification Search
CPC ... E01H 10/007; A01C 15/003; A01C 15/006; B65D 77/0466; B65D 88/12; B65D 90/20; E01C 19/12; E01C 19/203
(Continued)

(56) References Cited

U.S. PATENT DOCUMENTS

| 2,568,445 A | * | 9/1951 | Grattan | B60D 1/14 239/651 |
| 3,297,617 A | | 1/1967 | Regenstein et al. | |

(Continued)

FOREIGN PATENT DOCUMENTS

| DE | 2423822 A1 | 12/1974 |
| DE | 9416907 U1 | 4/1995 |

(Continued)

OTHER PUBLICATIONS

International Search Report and Written Opinion dated Aug. 2, 2016 in International Patent Application No. PCT/US2016/028989.

*Primary Examiner* — Steven J Ganey
(74) *Attorney, Agent, or Firm* — Marshall, Gerstein & Borun LLP

(57) ABSTRACT

A material spreading system including a spreader and a tote, and related methods, are disclosed. The spreader may include a frame attachable to a loading machine such as a skid loader, an inlet for receiving a material, one or more connector members, and a discharge mechanism configured to selectively discharge the material onto the ground. The tote may include a container for storing the material and one or more connector members. The connector members of the tote may be configured to matingly engage the connector members of the spreader such that an opening in the container aligns with the inlet of the spreader. Accordingly, the material in the container may be transferred from the container to the spreader. Furthermore, the material spreading system may be used in various application including those involving the spread of granular and/or liquid de-icing material over the ground.

53 Claims, 33 Drawing Sheets

(51) Int. Cl.
  *A01C 15/00* (2006.01)
  *E01C 19/20* (2006.01)
  *B65D 88/12* (2006.01)
  *B65D 90/20* (2006.01)
  *B65D 77/04* (2006.01)
  *B05B 13/00* (2006.01)
  *A01C 17/00* (2006.01)

(52) U.S. Cl.
  CPC ......... *B65D 77/0466* (2013.01); *B65D 88/12* (2013.01); *B65D 90/20* (2013.01); *E01C 19/20* (2013.01); *E01C 19/203* (2013.01); *A01C 17/001* (2013.01); *B05B 13/005* (2013.01); *E01C 2019/207* (2013.01); *E01C 2019/2095* (2013.01)

(58) Field of Classification Search
  USPC ............ 239/7, 650, 651, 661, 663, 681, 687
  See application file for complete search history.

(56) References Cited

U.S. PATENT DOCUMENTS

| | | | |
|---|---|---|---|
| 3,583,646 A | 6/1971 | Bogenschutz | |
| 3,655,093 A | 4/1972 | Sadwith | |
| 4,261,520 A | 4/1981 | Hetrick | |
| 4,405,089 A | 9/1983 | Taylor | |
| 4,522,341 A | 6/1985 | Wall et al. | |
| 4,523,280 A | 6/1985 | Bachman | |
| 4,588,113 A | 5/1986 | Egerdahl | |
| 4,966,311 A | 10/1990 | Taylor | |
| 5,108,038 A | 4/1992 | Palladino et al. | |
| 5,170,947 A | 12/1992 | Houle et al. | |
| 5,375,773 A | 12/1994 | Lewis | |
| 5,445,192 A | 8/1995 | Hansen | |
| 5,603,452 A | 2/1997 | Hester | |
| 5,842,649 A | 12/1998 | Beck et al. | |
| 5,911,362 A | 6/1999 | Wood et al. | |
| 5,947,391 A | 9/1999 | Beck et al. | |
| 5,988,534 A | 11/1999 | Kost et al. | |
| D425,915 S | 5/2000 | Truan et al. | |
| 6,068,200 A | 5/2000 | Kime | |
| 6,089,478 A | 7/2000 | Truan et al. | |
| 6,220,532 B1 | 4/2001 | Manon et al. | |
| 6,398,137 B1 | 6/2002 | Manon et al. | |
| 6,422,490 B1 | 7/2002 | Truan et al. | |
| 6,517,281 B1 | 2/2003 | Rissi | |
| 6,520,458 B2 | 2/2003 | Podoll et al. | |
| 6,536,067 B1 | 3/2003 | Truan et al. | |
| 6,557,944 B1 | 5/2003 | Connor | |
| D476,999 S | 7/2003 | Truan et al. | |
| D478,543 S | 8/2003 | Truan et al. | |
| 6,637,678 B2 | 10/2003 | Wyne | |
| 6,715,703 B2 | 4/2004 | Kost et al. | |
| 6,722,590 B2 | 4/2004 | Kost et al. | |
| 6,817,552 B2 | 11/2004 | Kinkead et al. | |
| 6,907,832 B2 | 6/2005 | Wyne | |
| 6,932,287 B2 | 8/2005 | Kost et al. | |
| 6,953,163 B2 | 10/2005 | Truan et al. | |
| 6,978,952 B2 | 12/2005 | Kost et al. | |
| 7,104,478 B2 | 9/2006 | Niemela et al. | |
| 7,118,053 B2 | 10/2006 | Truan et al. | |
| 7,196,276 B1 | 3/2007 | Cope | |
| D544,428 S | 6/2007 | Truan et al. | |
| 7,293,723 B2 | 11/2007 | Niemela et al. | |
| 7,306,175 B1 | 12/2007 | Farmer | |
| D559,759 S | 1/2008 | Truan et al. | |
| 7,347,390 B2 | 3/2008 | Truan et al. | |
| 7,431,227 B2 | 10/2008 | Gamble, II et al. | |
| 7,481,384 B2 | 1/2009 | Truan et al. | |
| 7,530,777 B2 | 5/2009 | Hintzsche et al. | |
| 7,540,436 B2 | 6/2009 | Truan et al. | |
| 7,748,652 B2 | 7/2010 | Musso et al. | |
| 7,753,293 B2 | 7/2010 | Farmer | |
| 8,025,245 B2 | 9/2011 | Truan et al. | |
| 8,028,938 B2 | 10/2011 | Truan et al. | |
| 8,185,276 B2 | 5/2012 | Buckbee et al. | |
| 8,262,004 B2 | 9/2012 | Gamble, II et al. | |
| 8,282,312 B2 | 10/2012 | Braddy et al. | |
| D673,586 S | 1/2013 | Truan et al. | |
| D673,587 S | 1/2013 | Truan et al. | |
| 8,448,882 B2 | 5/2013 | Kemmerling et al. | |
| 8,474,735 B2 | 7/2013 | Hobbs, Jr. et al. | |
| 8,505,837 B2 | 8/2013 | Warchola | |
| 8,523,086 B2 | 9/2013 | Warchola | |
| 8,757,521 B2 | 6/2014 | Cichy et al. | |
| 8,888,025 B2 | 11/2014 | Sandler | |
| 8,919,663 B2 | 12/2014 | Cantin et al. | |
| 8,960,574 B2 | 2/2015 | Hernandez | |
| 9,033,265 B2 | 5/2015 | Truan et al. | |
| 9,085,862 B2 | 7/2015 | Norkus et al. | |
| 9,085,863 B2 | 7/2015 | Norkus et al. | |
| 9,096,979 B2 | 8/2015 | Larsen | |
| 2003/0168522 A1 | 9/2003 | Kost et al. | |
| 2003/0168536 A1 | 9/2003 | Kost et al. | |
| 2004/0140377 A1 | 7/2004 | Kost et al. | |
| 2004/0144857 A1 | 7/2004 | Kost et al. | |
| 2007/0069044 A1 | 3/2007 | Sandler et al. | |
| 2008/0077300 A1 | 3/2008 | Balogh | |
| 2012/0023434 A1 | 1/2012 | Ording et al. | |
| 2012/0126023 A1 | 5/2012 | Cantin et al. | |
| 2014/0117122 A1 | 5/2014 | Pare et al. | |
| 2014/0286739 A1 | 9/2014 | Helmsderfer et al. | |
| 2014/0321950 A1 | 10/2014 | Krenek et al. | |
| 2014/0374515 A1 | 12/2014 | Truan et al. | |
| 2015/0175365 A1 | 6/2015 | Picard et al. | |

FOREIGN PATENT DOCUMENTS

| | | | | |
|---|---|---|---|---|
| DE | 29600737 U1 | 2/1996 | | |
| FI | 102306 B1 | 11/1998 | | |
| FR | 1592096 A | 5/1970 | | |
| FR | 2216755 A1 | 8/1974 | | |
| FR | 2284271 A1 | 4/1976 | | |
| FR | 2284271 B1 * | 2/1979 | ........... | A01C 15/003 |
| FR | 2855533 A1 | 12/2004 | | |
| GB | 1468902 A | 3/1977 | | |

\* cited by examiner

MATERIAL SPREADING SYSTEMS AND METHODS

CROSS REFERENCE TO RELATED APPLICATION

The priority benefit of U.S. Provisional Patent Application No. 62/151,558, filed Apr. 23, 2015, is claimed, and the entire contents thereof are expressly incorporated herein by reference.

FIELD OF THE DISCLOSURE

The present disclosure relates to a material spreading system and, in particular, to a material spreading system adaptable with a skid loader for self loading freestanding totes of de-icing material, such as grit, rock salt, and/or sand, for snow and ice removal.

BACKGROUND OF THE DISCLOSURE

A gritter is a vehicle, also known as a salt truck, used to spread salt onto roads. The gritter holds a large hopper on the rear of the vehicle for holding large amounts of salt and an impeller for spreading the salt onto the roadways. Salt helps to reduce the melting point of ice on the roadways, thus causing the ice to melt and run off the roadways. The salt may also be mixed with sand to increase the friction between the roadway and tires. A significant limitation, however, is that the salt must be stored at a central location and loaded onto the gritters for distribution to remote sites. This distribution scheme can require significant time and costs, because of the need to employ crews to drive to the central location, load up the salt, and deliver to remote sites. Especially in the event of a snow emergency, the service response time may be too slow to respond appropriately.

SUMMARY OF THE DISCLOSURE

The present disclosure provides spreading systems and methods that may be used with a preexisting skid loader or other loading machine for distributing a granular de-icing material (e.g., grit, salt, and/or sand), a liquid de-icing material, or any combination thereof onto roadways, parking lots, sidewalks, driveways, and/or other ground surfaces for de-icing or other purposes. A spreader attachment, such as a spinner spreader, may be coupled to the skid loader and powered by the hydraulic system of the skid loader. The spreader attachment may include a hopper for receiving the de-icing material and a discharge assembly for the discharge of the de-icing material onto the ground. The hopper of the spreader attachment may be refilled from a freestanding tote, which holds the de-icing material at or near the site of application. Lift arms or other connector members may extend from the spreader attachment may help lift the tote to the hopper and allow the de-icing material to dispense from the tote to the hopper opening. This system eliminates the need for salt trucks to dispatch from a central location for delivery, and allows for quick and efficient salt spreading at the location of application.

One of the advantages of the present disclosure is to reduce the need for large salt trucks to be on the roadways during a snow emergency. Instead, the present disclosure allows the totes to be pre-loaded on site before the snow emergency. Then, when a snow event occurs, salt spreaders that are already on or near to the application site can load salt from the pre-loaded on-site salt totes. This decreases the number of vehicles on the roadways during a snow emergency, and quickens the response time for deicing the roads.

Another advantage of the present disclosure is to reduce the costs associated with preexisting procedures for snow and ice removal. By eliminating the need for salt trucks to travel to a central site to load salt and deliver the salt to remote locations, a cost savings is achieved. For example, there is a cost savings associated with reducing the amount of fuel needed to operate the vehicles, lower insurance costs, less employees and man hours needed, and less vehicles and equipment required.

Another advantage of the present disclosure is to allow operators to apply salt at a pre-budgeted rate determined by the volume of salt loaded into the tote. Therefore, a predetermined amount of salt is loaded into the totes, and thus, applied to the surface during application. For example, the tote may hold one or two applications of salt delivery. Therefore, excess salt is not applied to the surface, and over-dispensing of salt may be avoided. Furthermore, the presently-disclosed system allows salt users to purchase a quantity of salt and store it at an application site weeks or months in advance of a weather event producing snow or ice, when the market price of salt may be relatively low. Accordingly, cost savings may be realized by avoiding the purchase of salt when market demand for salt is high, for example, in the run-up to a significant winter storm.

Another advantage of the present disclosure is to store the deicing material in an environmentally safe container, and prevent contamination to groundwater, rivers and streams.

These particular objects and advantages may apply to only some embodiments falling within the claims and thus do not define the scope of the present disclosure.

One aspect of the present disclosure provides a material spreading system, including a spreader and a tote. The spreader may include a frame attachable to a loading machine, an inlet for receiving a material, a discharge mechanism configured to selectively discharge the material onto the ground, and a first spreader connector member. The tote may be configured to selectively engage with the spreader. The tote may include a first tote connector member and a container having a plurality of walls enclosing an interior space for storing the material. An opening may be formed in one of the plurality of walls. The first tote connector member may be configured to matingly engage the first spreader connector member such that the first spreader connector member can lift the container. Furthermore, the opening may align with the inlet of the spreader when the first spreader connector member matingly engages the first tote connector member, thereby permitting transfer of the material from the container to the discharge mechanism.

Another aspect of the present disclosure provides a method of distribution of a material. The method may include: (i) providing a quantity of material; (ii) storing the quantity of material in a plurality of totes at an application site; (iii) engaging one of the totes with a spreader device; and (iv) transferring the material from the engaged tote to the spreader device at the application site and distributing the material over the ground of the application site with the spreader device.

Yet another aspect of the present disclosure provides a tote for storing a material. The tote may include a container, an opening, a first receiving member, and a second receiving member. The container may have an interior space enclosed by a bottom wall, a top wall, a front wall extending between the bottom wall and the top wall, a first sidewall extending between the front wall and the rear wall, and a second sidewall extending between the front wall and the rear wall. The opening may extend through the front wall of the container and provide access to the interior space. The first receiving member may define a first planar surface and may be configured to receive a first lift arm. The second receiving member may define a second planar surface and may be configured to receive a second lift arm.

An additional aspect of the present disclosure provides a spreader for a loading machine. The spreader may include a frame attachable to the loading machine, an inlet for receiving a material, a discharge mechanism, and a first lift arm. The discharge mechanism may be configured to selectively discharge the material onto the ground. The first lift arm may extend in a first direction away from the discharge mechanism and terminate at a first exposed distal end.

Another aspect of the present disclosure provides a spreading method for a material stored in a tote. The spreading method may include: (i) attaching a spreader to a loading machine; (ii) aligning an inlet of the spreader with an opening in a front wall of the tote; (iii) driving the loading machine in a forward direction toward the front wall of the tote such that a lift arm of the spreader matingly engages a receiving member of the tote; (iv) using the loading machine to rotate the tote to a position in which the tote is positioned above the inlet of the spreader, such that the material falls through the opening in the front wall of the tote and into the inlet of the spreader; and (v) operating a discharge mechanism of the spreader to discharge the material onto the ground.

DETAILED DESCRIPTION

Figure 1:
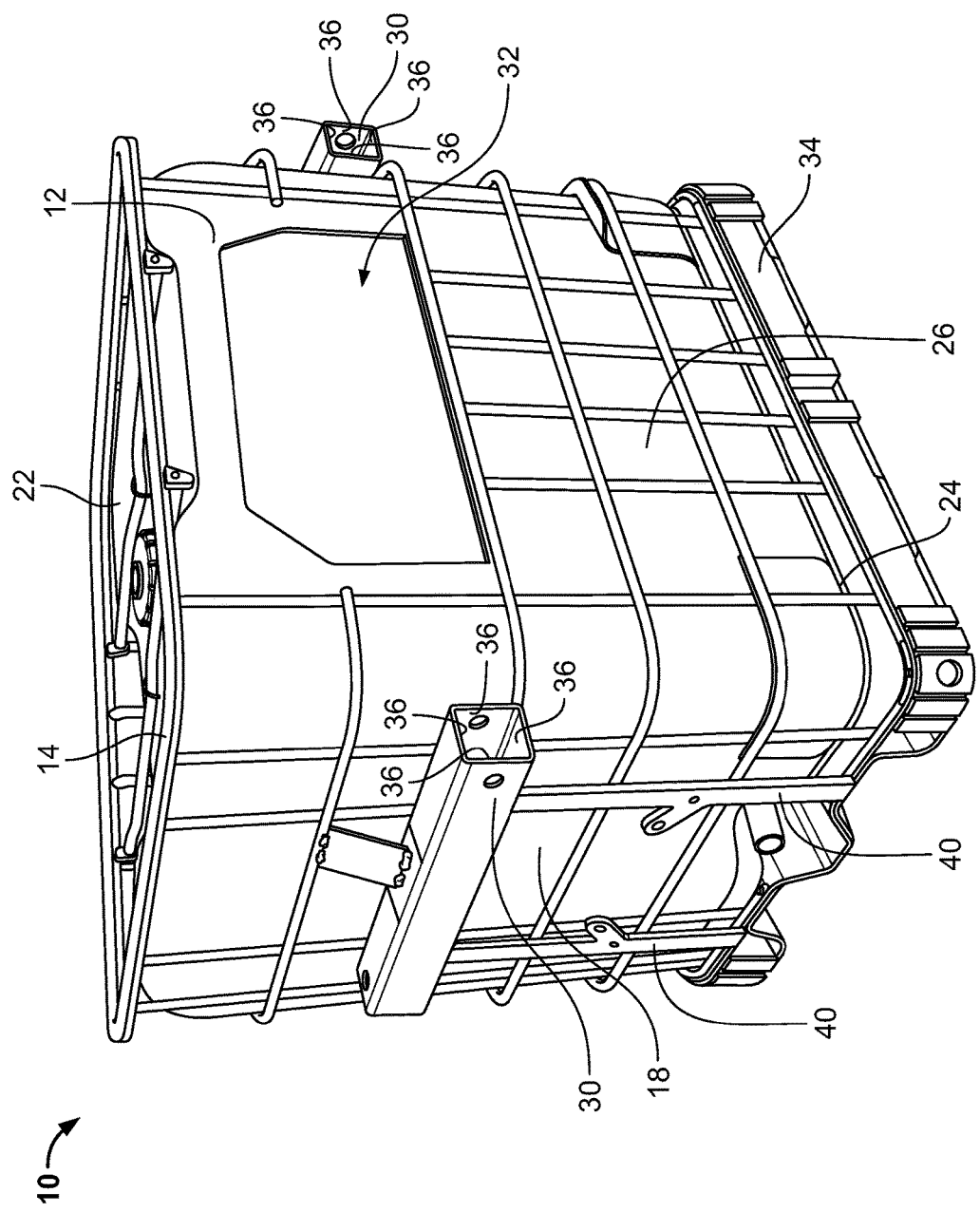
FIG. 1 is a perspective view of the salt tote of a first embodiment of the present disclosure viewed from a first orientation, showing an opening for transferring salt from the salt tote to a salt spreader and lifting rails extending along the sidewalls of the salt tote.
Figure 2:
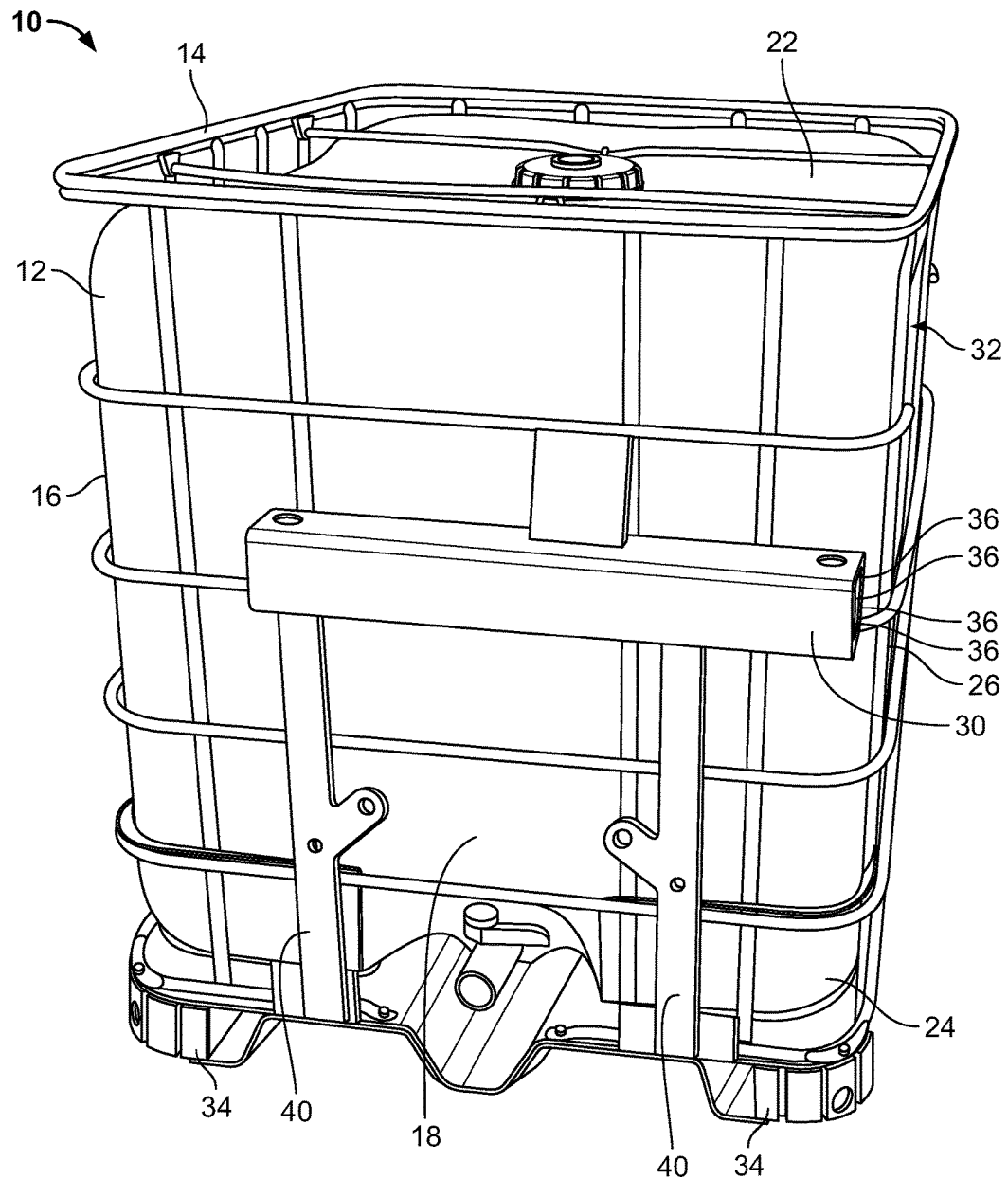
FIG. 2 is side elevation view of the salt tote of FIG. 1, showing the receiving rail extending along a sidewall of the salt tote.
Figure 3:
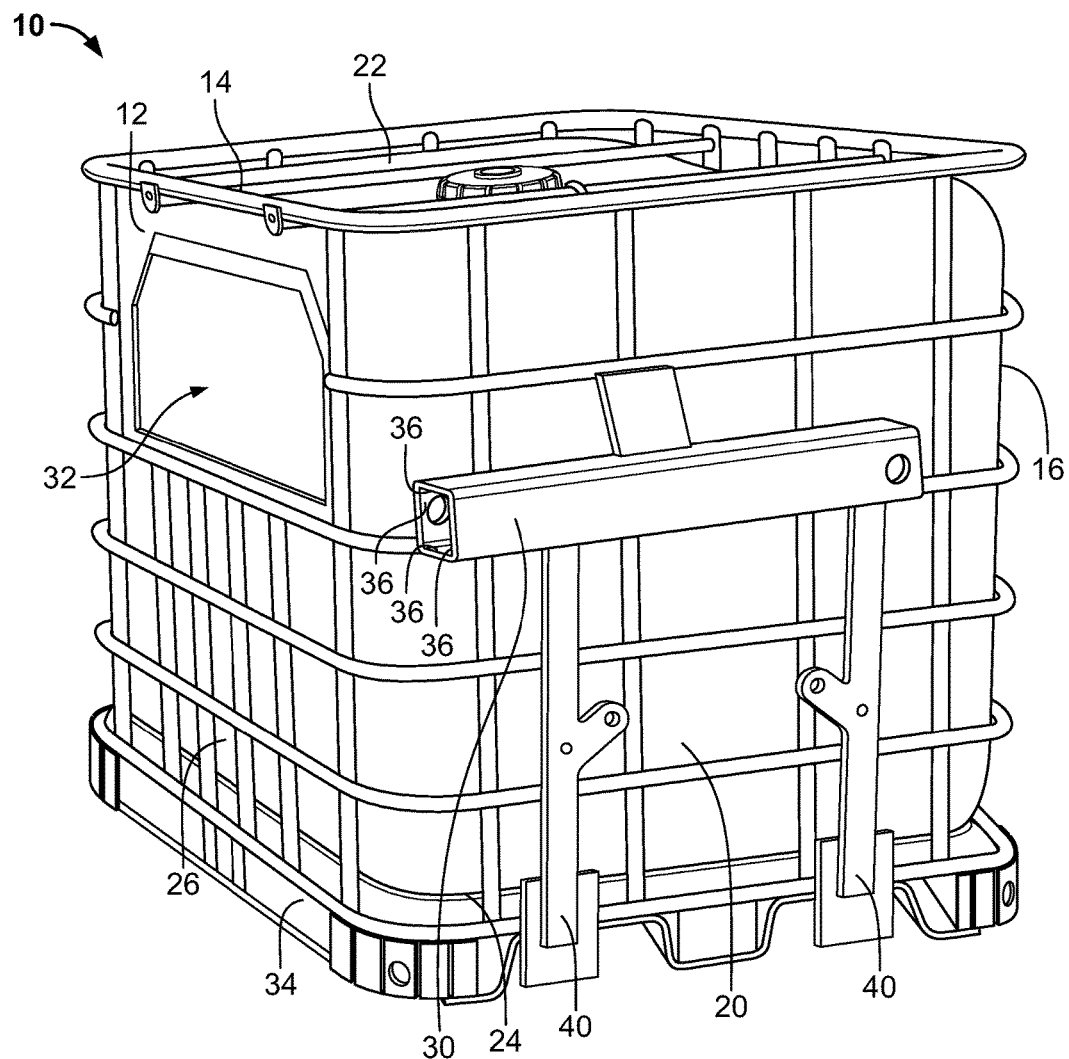
FIGS. 3-8 are a sequence of drawings showing the attachment of the salt tote of FIG. 1 to a salt spreader device of a skid loader whereby the lift arms of the salt spreader device are inserted into the lifting rails of the salt tote until the opening of the salt tote mates with a hopper of the salt spreader device, and the lift arms are then lifted to transfer the salt from the salt tote to the hopper.
Figure 4:
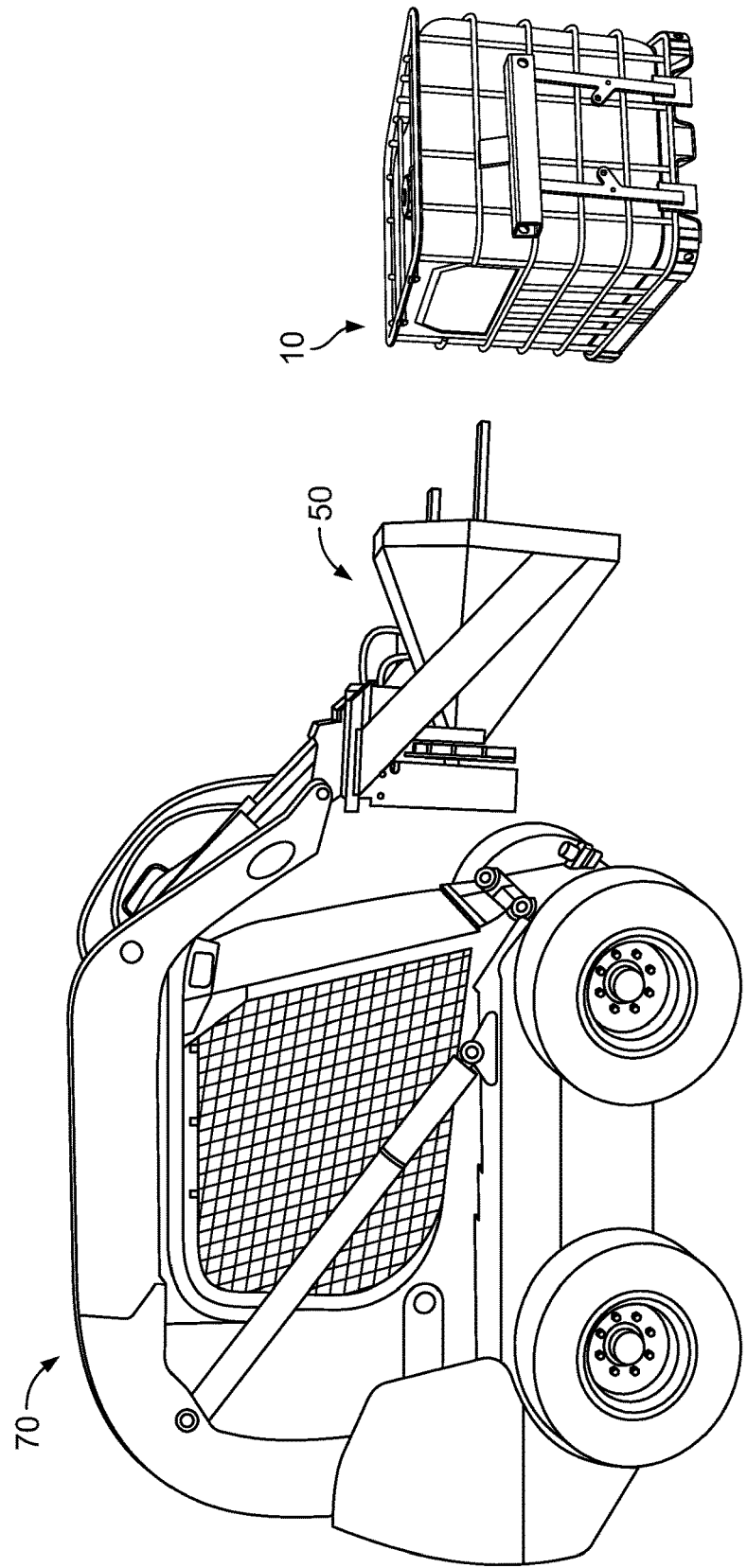
Figure 5:
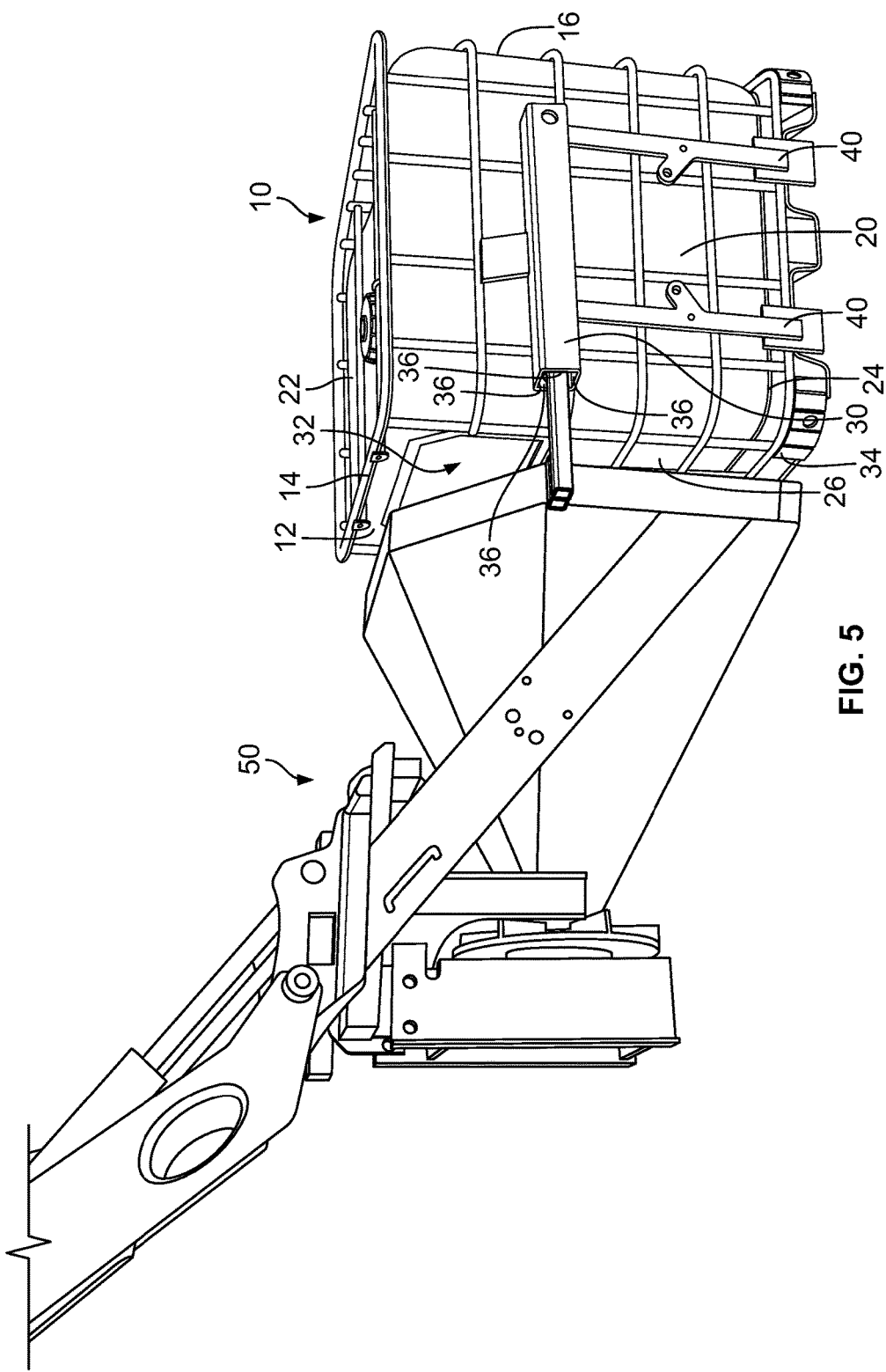
Figure 6:
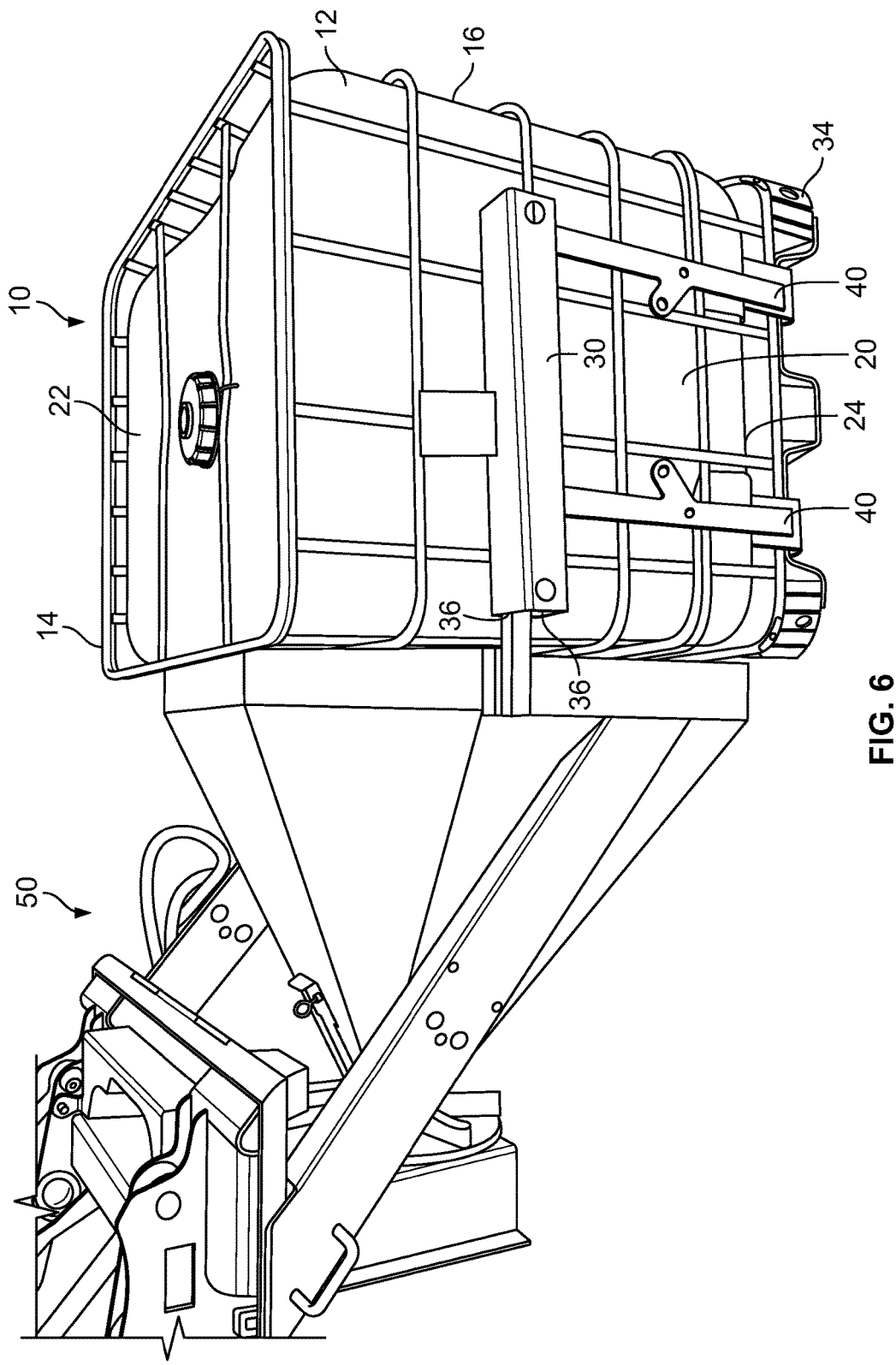
Figure 7:
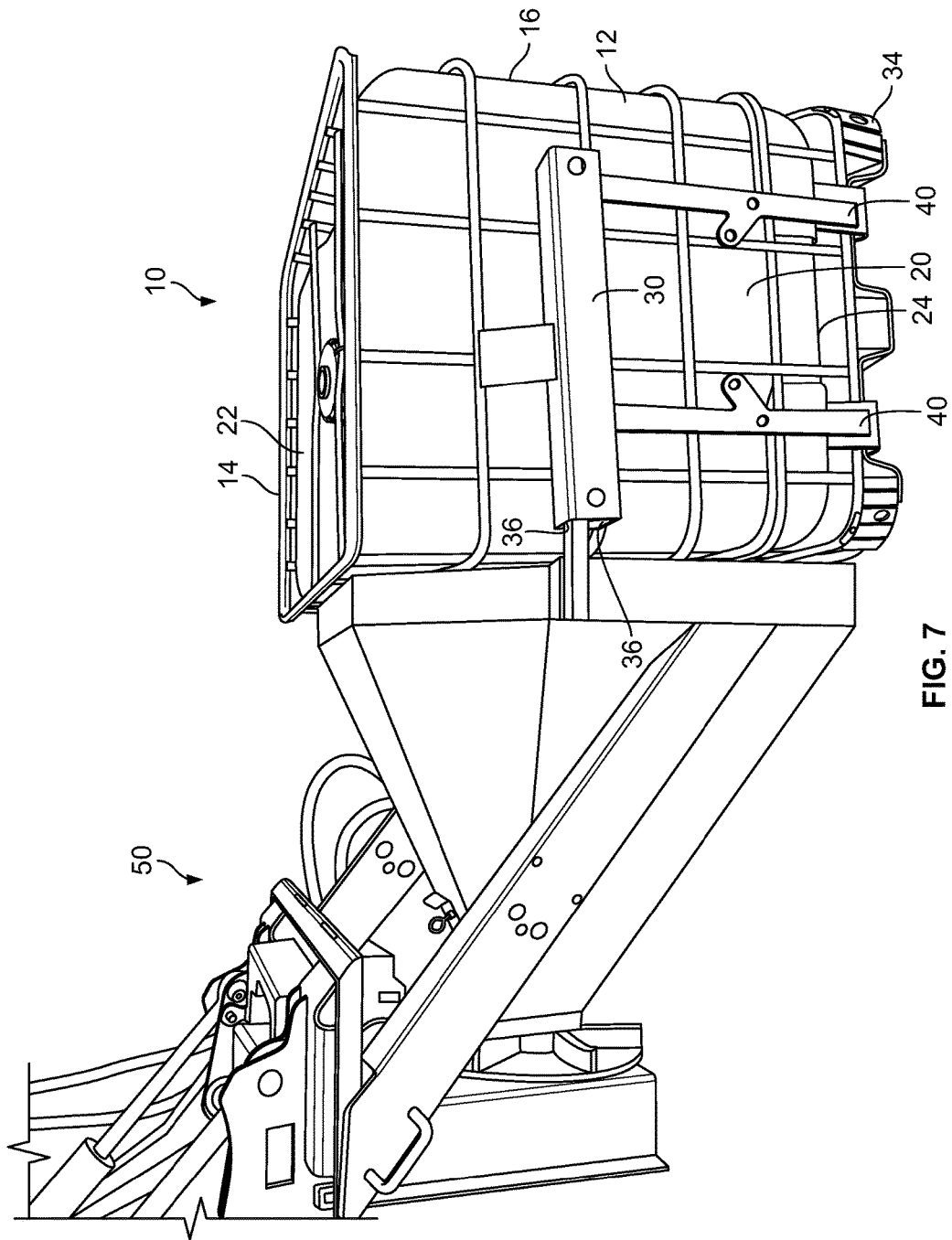
Figure 8:
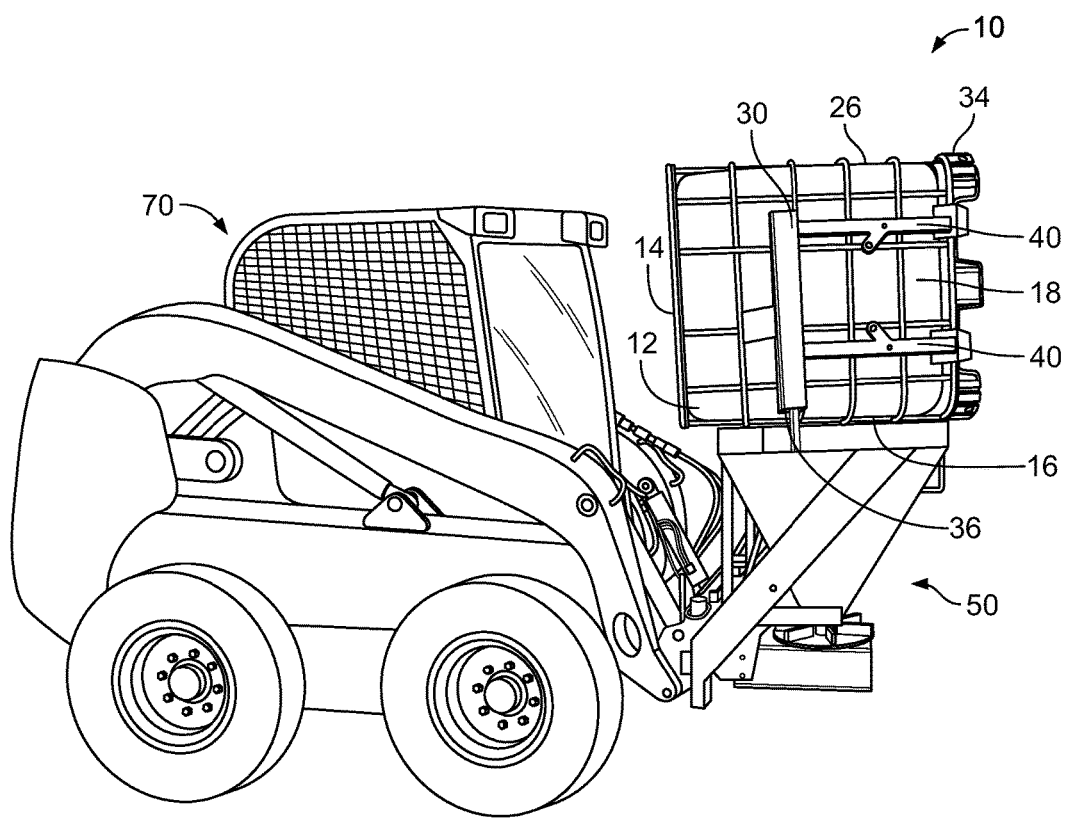

Referring now to FIGS. 1-3, a salt spreading system constructed in accordance with the present disclosure may provide for a salt tote 10 providing an enclosure 12 (e.g., a container) supported by and enclosed within a durable frame 14. The enclosure 12 has a plurality of walls defining a rectangular volume or cavity, including a vertically extending rear wall (e.g., a back sidewall) 16 joined on its left and right edges by vertically extending left 18 and right 20 sidewalls extending forward from the back sidewall 16. A top wall 22 and bottom wall 24 are joined to the upper and lower edges of the rear wall 16 and sidewalls 18, 20, respectively, to define a ceiling and floor of the enclosure 12. The sidewalls 18, 20 and top wall 22 and bottom wall 24 are joined on their front edges by a front wall 26. Accordingly, the front wall 26 may extend between the bottom wall 24 and the top wall 22, and the sidewalls 18, 20 may each extend between the front wall 26 and the rear wall 16. When the salt tote 10 is disposed on the ground, as illustrated in FIG. 1, the bottom wall 16 may face in a direction toward the ground and/or be parallel to the ground. The enclosure 12 may be made of an environmentally safe material which prevents egress or ingress of chemicals or moisture. For example, the enclosure 12 may be made of a durable plastic material. The walls of the enclosure 12 may have a length, width and/or height of at least three feet long. It is contemplated that the walls of the enclosure 12 may have varying lengths to provide varying volumes of salt storage.

The front wall 26 of the enclosure 12 includes a front opening 32 which is generally rectangular in shape. The opening 32 allows grit or salt to pass into an interior of the enclosure 12, defined by a volume for holding grit or salt. It is contemplated that the opening 32 may take any shape or size as desired. The opening 32 is off-set from the middle of the front wall 26. The opening 32 is generally located at an upper half of the front wall 26 so that the volume of the enclosure 12 may hold a desired volume of salt without the salt spilling out through the opening 32. The placement of the opening 32 allows for the largest carrying capacity of the enclosure 12.

The enclosure 12 is armor-plated by the durable frame 14 extending around an exterior of the enclosure 12. The frame 14 may extend around all or some of the sides of the enclosure 12. The frame 14 may be a metal frame, comprised of a structure of intersecting metal bars, resembling a cage. It is contemplated that the frame 14 may also be a solid metal structure or a combination of bars and solid metal. The frame 14 provides improved strength and protection to the enclosure 12 and provides rails or other connector members for lifting the enclosure 12, as will be further described below. The frame 14 may also include a base 34 extending underneath the enclosure 12 and which provides vertical elevation to the enclosure 12, lifting the enclosure 12 off the ground to prevent moisture on the ground from contacting the enclosure 12 and its contents. It is contemplated that the frame 14 may take many different constructions which remain consistent with the spirit of the present disclosure.

The frame 14 includes a pair of lifting rails 30 which extend along an exterior of the sidewalls 18, 20 of the enclosure 12, one along each sidewall 18, 20. As described below in more detail, the lifting rails 30 may function as receiving members for receiving respective lift arms of a spreader device. In some embodiments, a distance separating the rails 30 may be equal to or substantially equal to a distance separating the lift arms to be received by the rails 30. Each of the lifting rails 30 may be mounted outwardly of a respective one of the sidewalls 18, 20 such that the lifting rails 30 are located on opposite sides of the enclosure 12. Furthermore, each of the lifting rails 30 may be rigidly connected to the base 34 by one or more support bars 40.

The pair of lifting rails 30 are defined by rectangular shaped tubes having a hollow interior. Although shown as being rectangular shaped tubes, it is contemplated that the lifting rails 30 may take many shapes and sizes, such as having a circular or square cross-section. The lifting rails 30 may not be fully enclosed tubes, but rather, may take a U-shaped cross-section as well. Each of the lifting rails 30 may include one or more planar interior surfaces 36 for interfacing with one or more planar exterior surfaces of a lifting arm, as described below in more detail. The pair of lifting rails 30 extend substantially the depth of the sidewalls 18, 20. However, it is contemplated that the pair of lifting rails 30 may be lengthened or shortened as desired to assist in lifting the enclosure 12, but are long enough to properly support the salt tote 10 when lifted. It is contemplated that the lifting rails 30 may be attached directly to the enclosure 12, in which case the frame 14 may be omitted from the salt tote 10. It is contemplated that the lifting rails 30 may take many different constructions which remain consistent with the spirit of the present disclosure.

Figure 9:
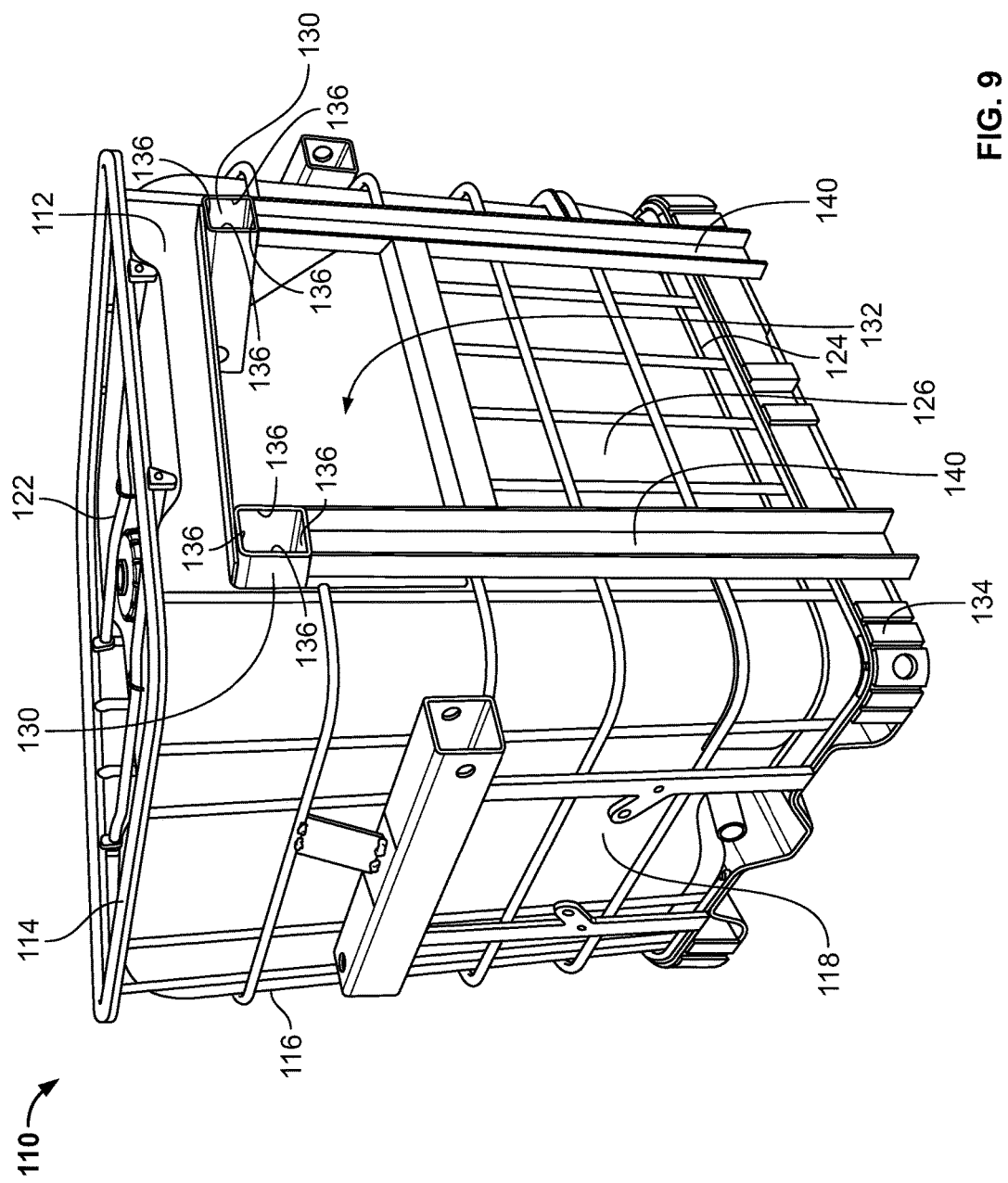
FIG. 9 is a perspective view of a salt tote of a second embodiment of the present disclosure viewed from a first orientation, showing an opening for transferring salt from the salt tote to a salt spreader and lifting rails extending into an interior of the salt tote.
Figure 10:
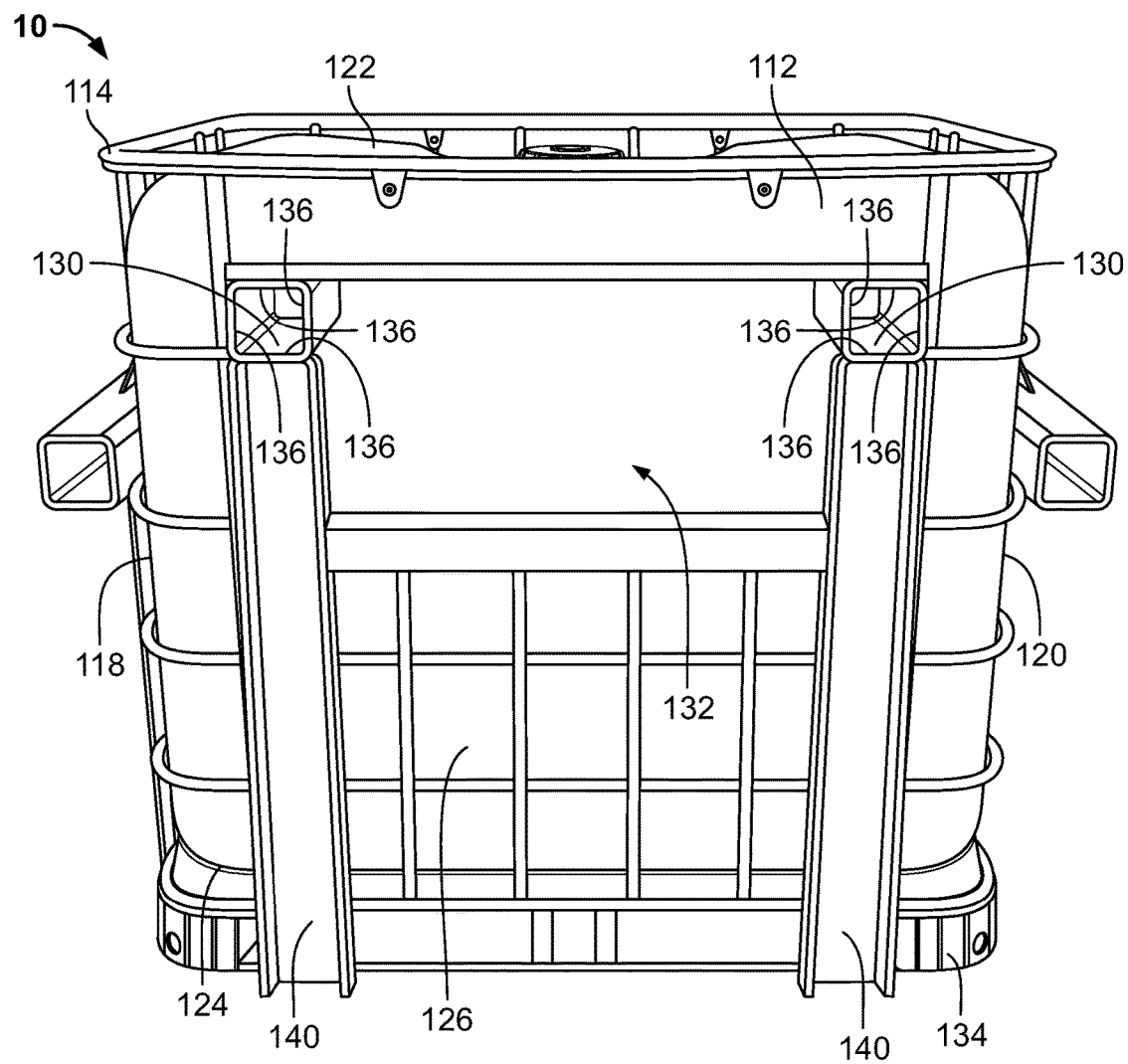
FIG. 10 is a front elevation view of the salt tote of FIG. 9, showing the lifting rails extending toward the rear wall of the salt tote.
Figure 11:
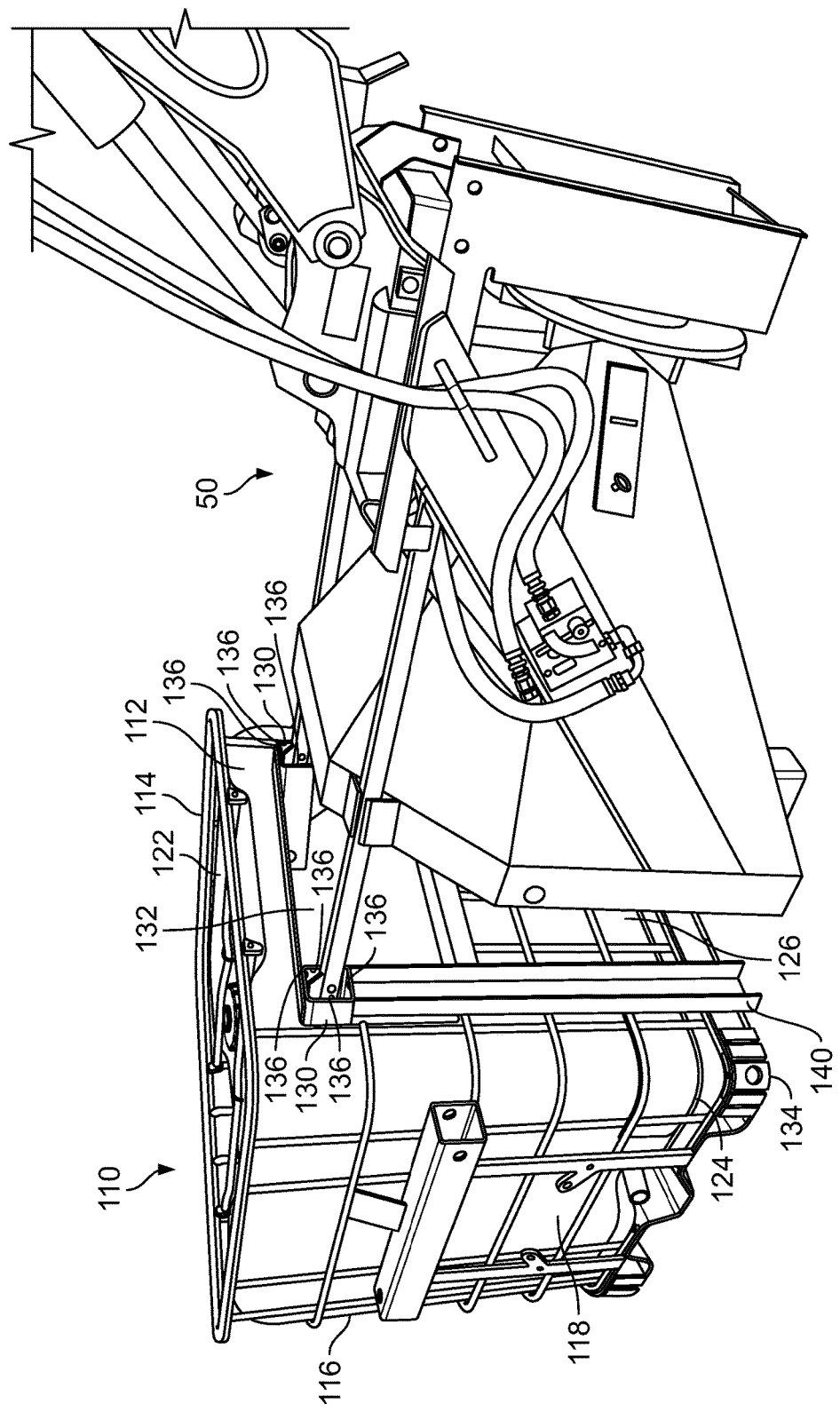
FIGS. 11-12 are a pair of perspective views showing the attachment of the salt tote of FIG. 9 to a salt spreader device of a skid loader whereby the lift arms of the salt spreader device are inserted into the lifting rails of the salt tote.
Figure 12:
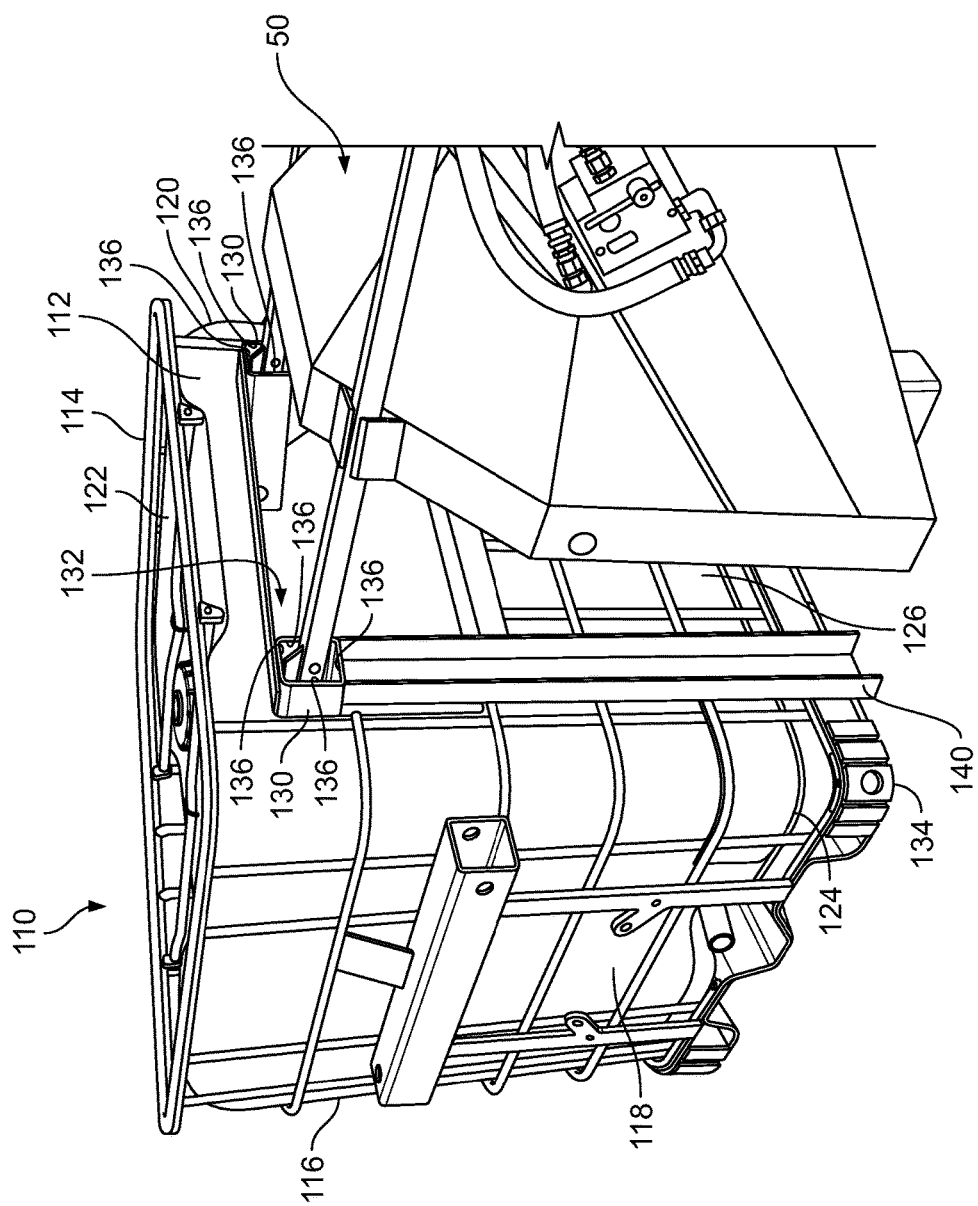
Figure 13:
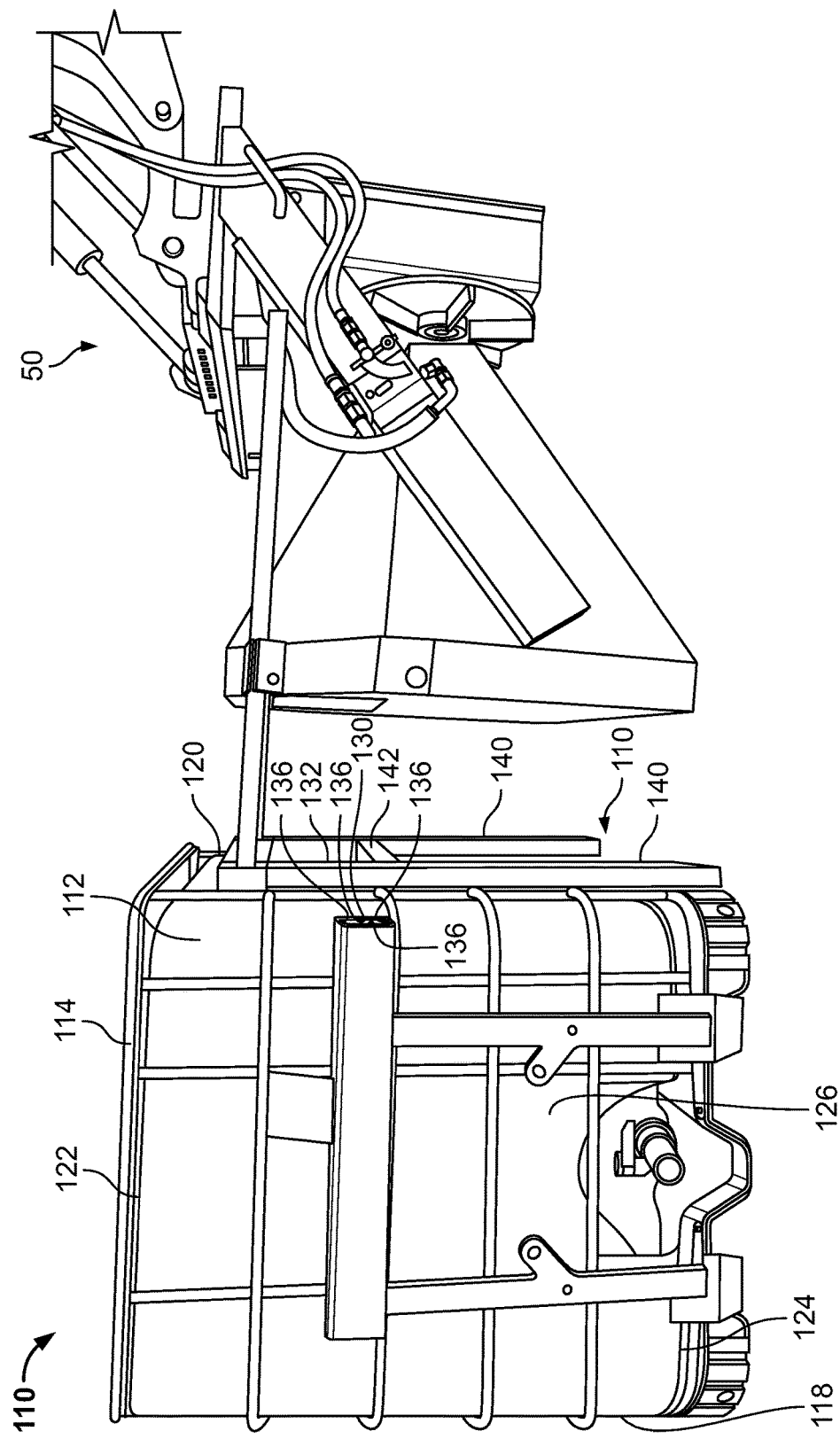
FIG. 13 is a side elevation view of the lift arms of the salt spreader device partially inserted into the lifting rails of the salt tote, and the opening of the salt tote aligning with the opening of the hopper of the salt spreader device.
Figure 14:
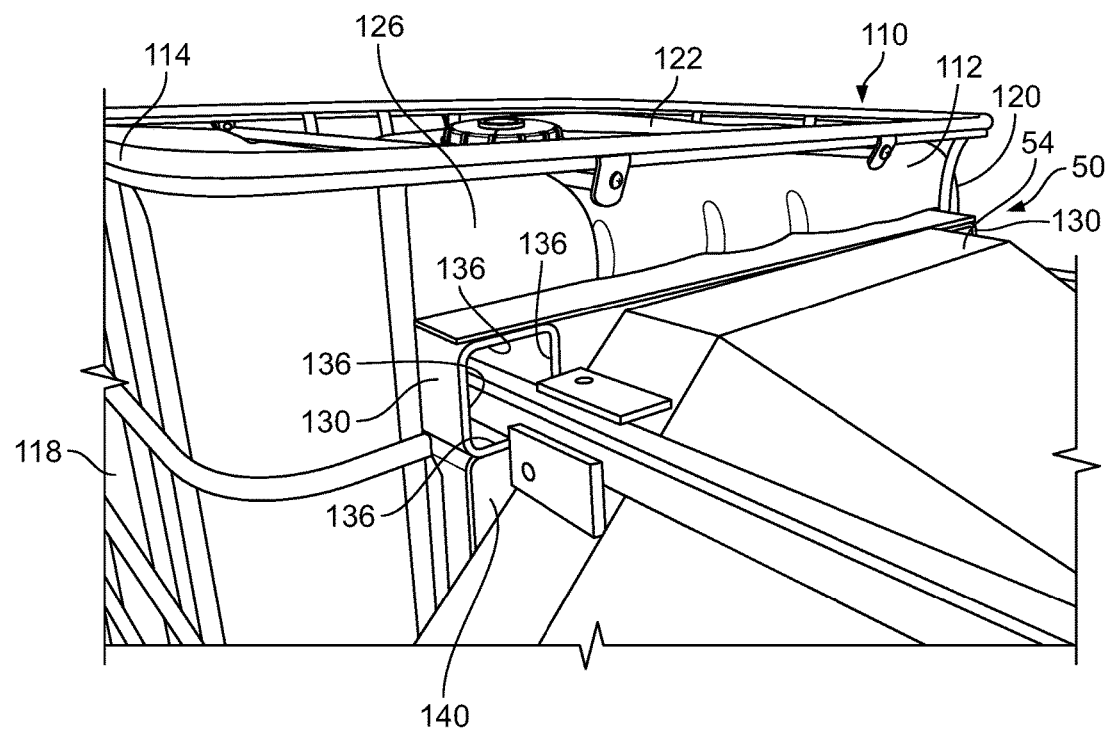
FIGS. 14-16 are enlarged views showing the lift arms of the salt spreader installed into the lifting rails of the salt tote so that the opening of the salt tote mates with an opening of the hopper of the salt spreader device.
Figure 15:
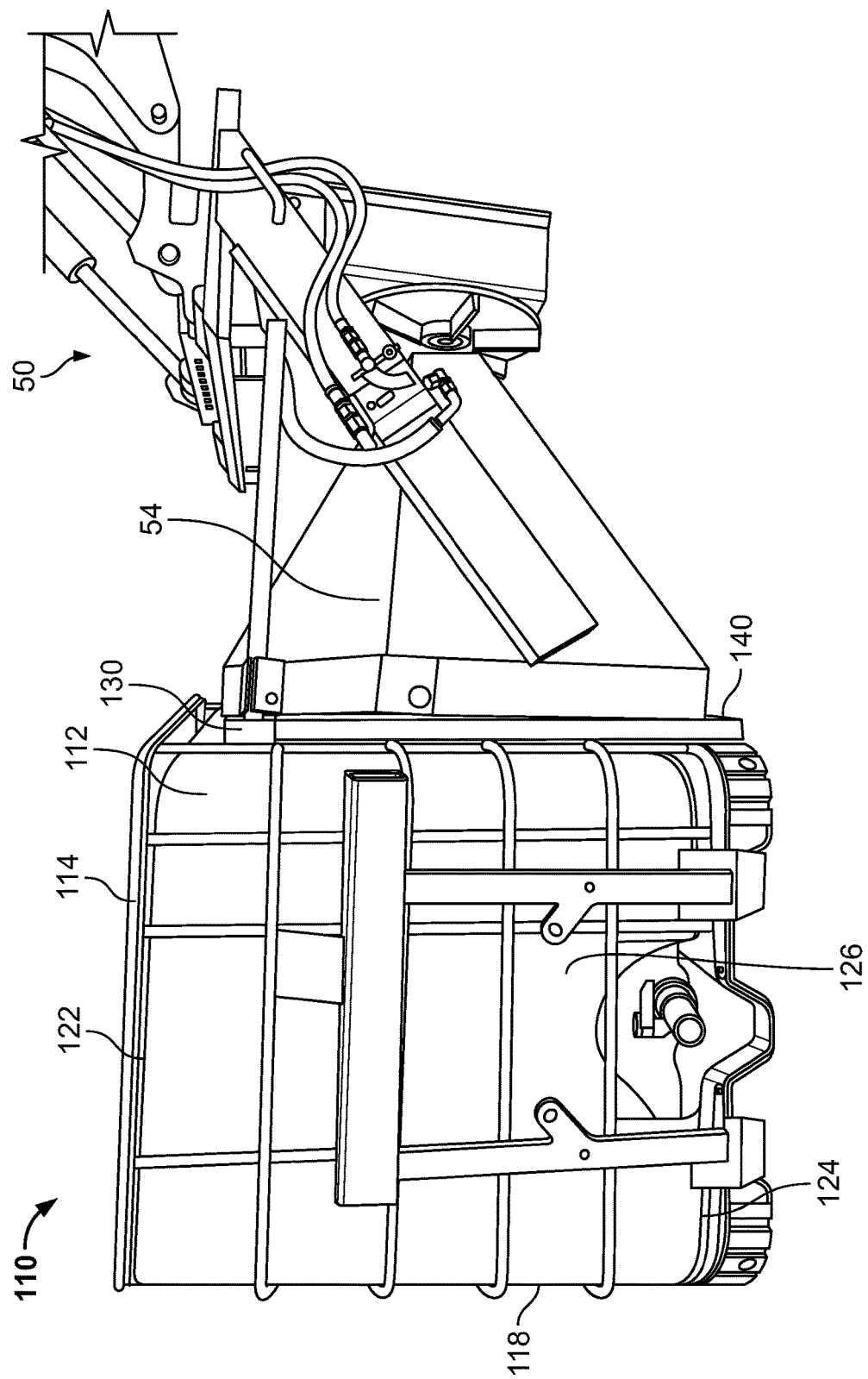
Figure 16:
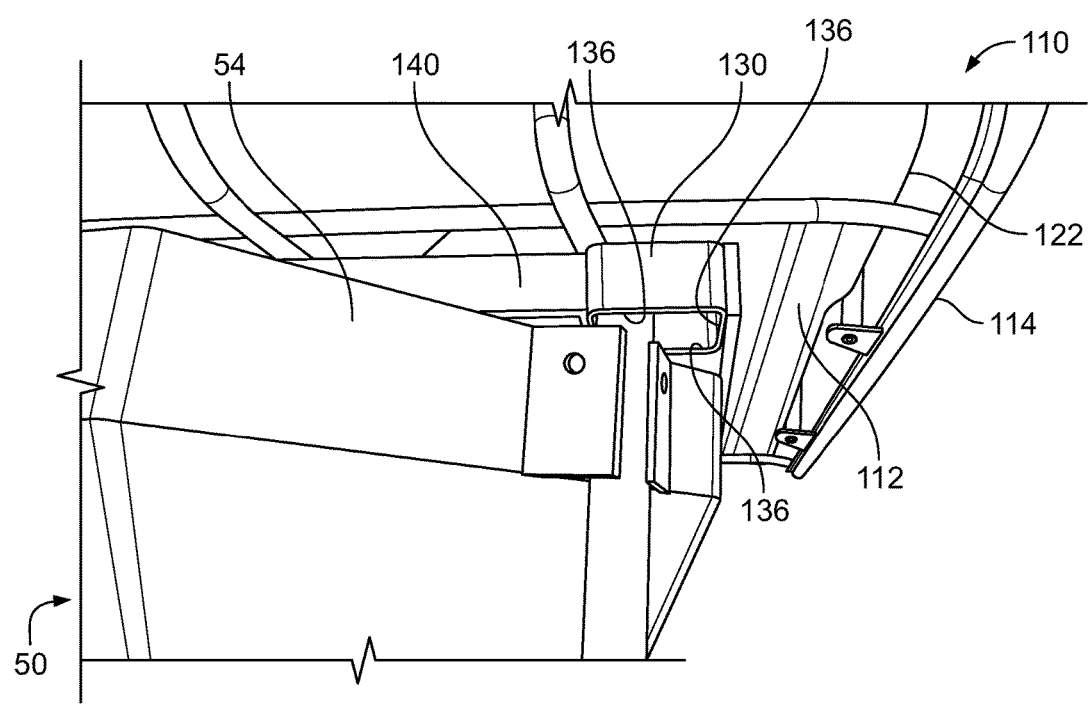

Referring now to FIGS. 9-10, a salt tote 110 is shown in accordance with an alternative embodiment of the present disclosure. The salt tote 110 is similar to the salt tote 10 of the first embodiment except for the placement of the lifting rails 130. Elements of the salt tote 110 of this alternative embodiment that correspond to the salt tote 10 of the first embodiment are designated by the same reference numeral, incremented by 100. A description of many of these elements is abbreviated or even eliminated in the interest of brevity.

The salt tote 110 is constructed having an enclosure 112 supported by a durable frame 114. While similar to the salt tote 10 of FIGS. 1-3, the lifting rails are positioned in a different location with respect to the enclosure 112. In the alternative embodiment, the frame 114 includes a pair of lifting rails 130 extending into an interior of the enclosure 112 instead of along the sidewalls 118, 120 of the enclosure. The pair of lifting rails 130 extends into the interior of the enclosure 112 at the top corners of the opening 132. The lift point is generally positioned above the center of the opening 132. The pair of lifting rails 130 may be attached at a front end to perpendicular support bars 140 extending downward from the pair of lifting rails 130. The support bars 140 extend downward along the exterior of the front wall 126 of the enclosure 112 and attach to the lower base 134. The support bars 140 may alternatively further extend underneath the enclosure 112 along the bottom wall 124. It is contemplated that the pair of lifting rails 130 and support bars 140 may be attached directly to the enclosure 112, in which case the frame 114 may be omitted.

It is contemplated that the pair of lifting rails 130 may extend into the enclosure 112 at any position generally central to the enclosure 112. It is also contemplated that the lifting rails 130 may be located in many different positions with respect to the enclosure 112 which still allow the salt tote 110 to be lifted.

It is also contemplated that there may be more or less than two lifting rails 130. For example, one, three, four, etc., lifting rails may be found on the salt tote 110. In this respect, the lift arms 58 of a salt spreader device 50 may be any number corresponding to the number of lifting rails 130 or less than the number of lifting rails 130 of the salt tote 110. The lift arms 58 of the salt spreader device will be further described below.

Figure 17:
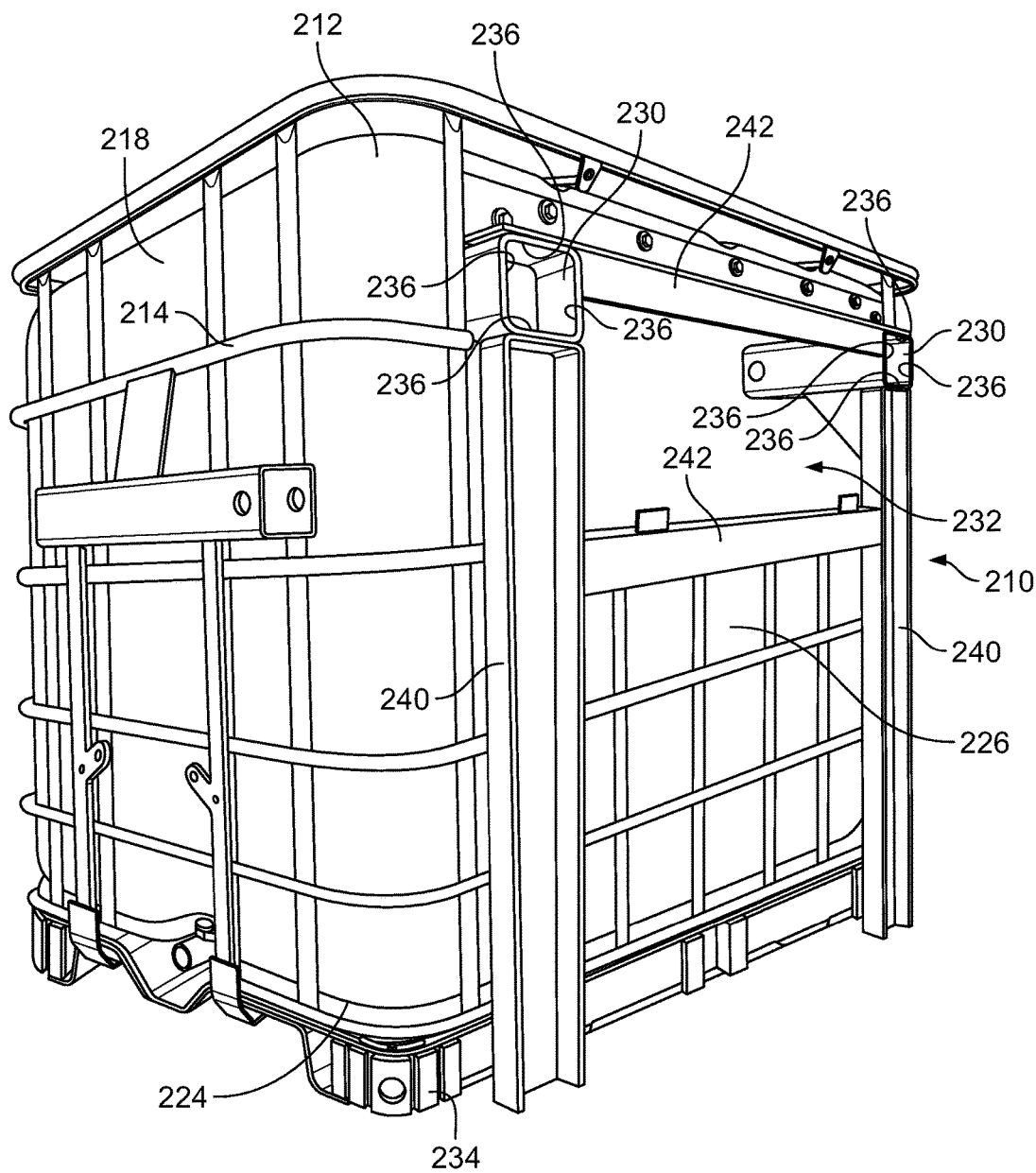
FIGS. 17-18 are a pair of perspective views of a salt tote of a third embodiment of the present disclosure viewed from a left and right side, showing an opening for transferring salt from the salt tote to a salt spreader and lifting rails extending into an interior of the salt tote with a guard rail at a top edge of the opening.
Figure 18:
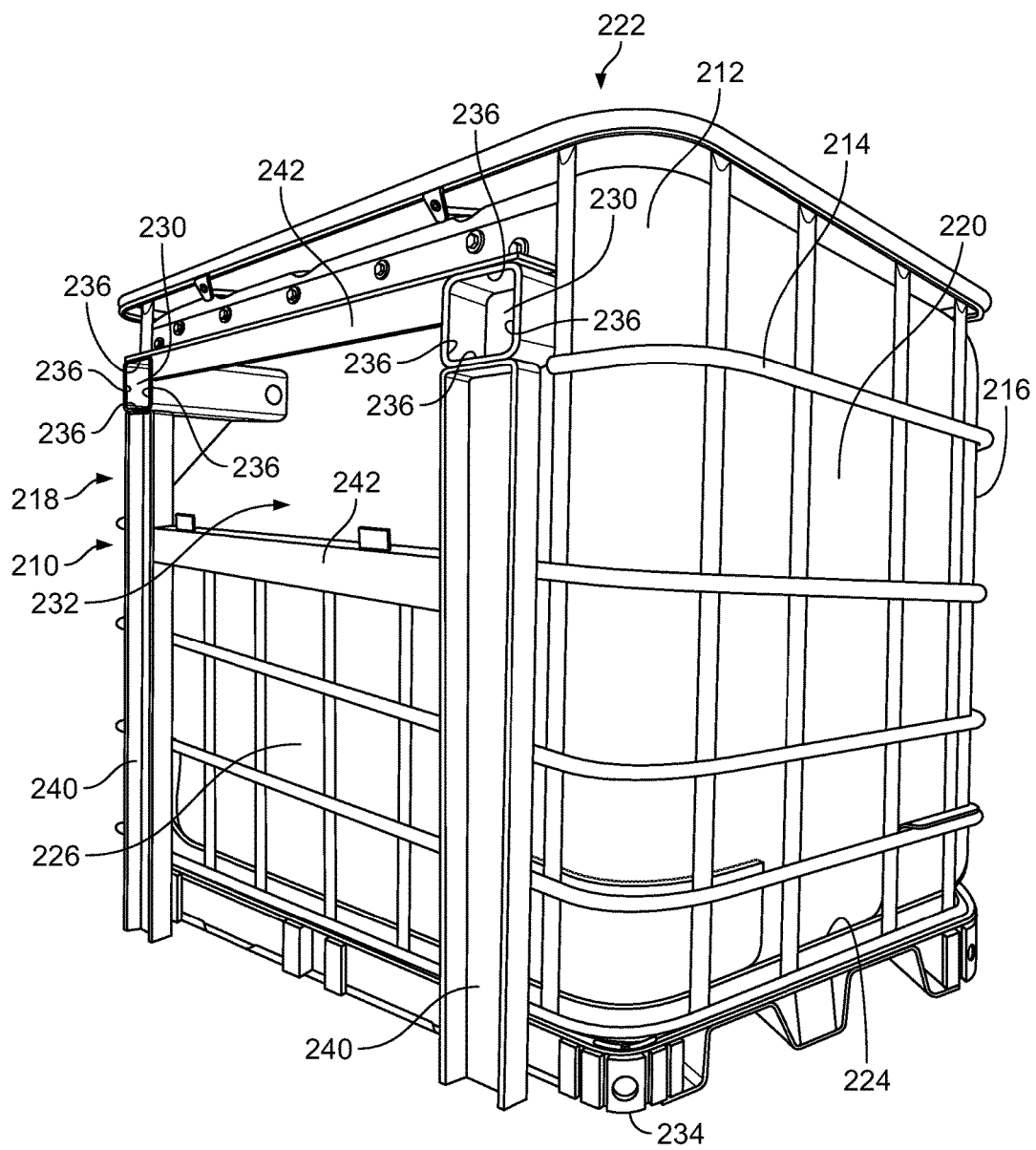
Figure 19:
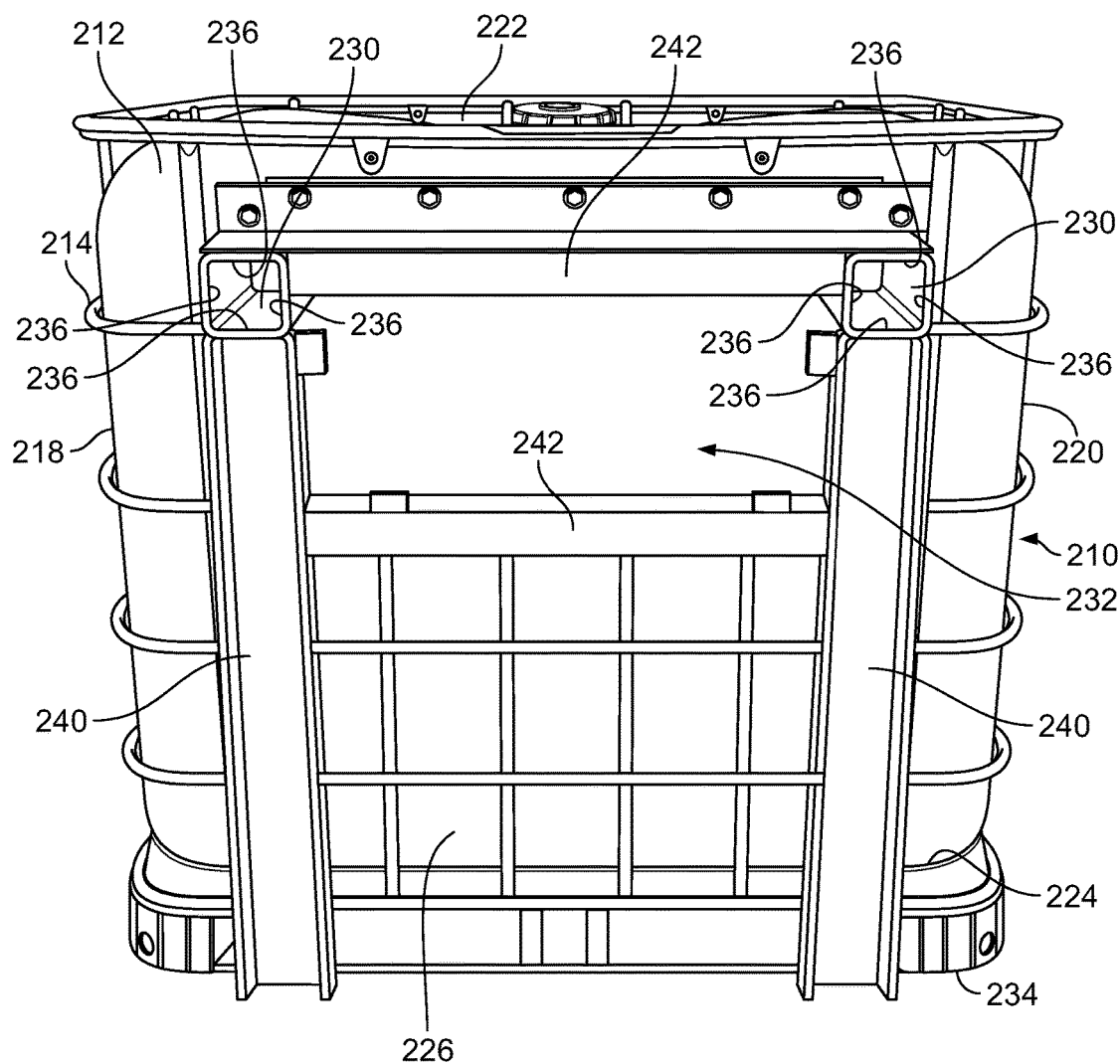
FIG. 19 is a front elevation view of the salt tote of FIGS. 17-18, showing the lifting rails extending toward the rear wall of the salt tote, and the guard rail at a top edge of the opening.
Figure 20:
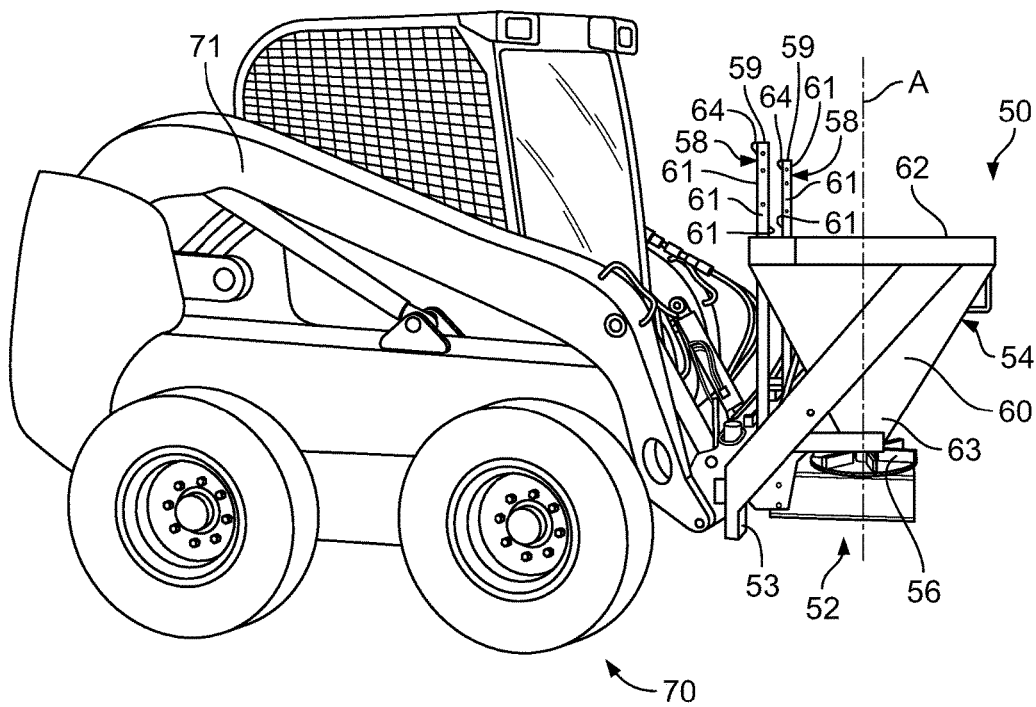
FIGS. 20-22 are a set of drawings showing a salt spreader device attached to a skid loader, whereby the salt spreader device includes a hopper for holding salt, the hopper having an opening, and a pair of lift arms extending outward from the salt spreader device.

Referring now to FIGS. 17-19, a salt tote 210 is shown in accordance with an alternative embodiment of the present disclosure. The salt tote 210 is similar to the salt tote 110 of the second embodiment except for an additional guard rail 242 placed at an upper edge of the opening 232. Elements of the salt tote 210 of this embodiment that correspond to the salt tote 110 of the second embodiment are designated by the same reference numeral, incremented by 100. A description of many of these elements is abbreviated or even eliminated in the interest of brevity. The salt tote 210 is constructed having an enclosure 212 supported by a durable frame 214. The front wall 226 of the enclosure 212 includes an opening 232. A guard rail 242 extends along an upper edge and a lower edge of the opening 232 to assist in sealing the junction between the outer surfaces of the opening 232 of the salt tote 210 and the opening of the salt spreader device. It is understood that the guard rail 242 acts as a gasket between the mating surfaces.

Figure 28:
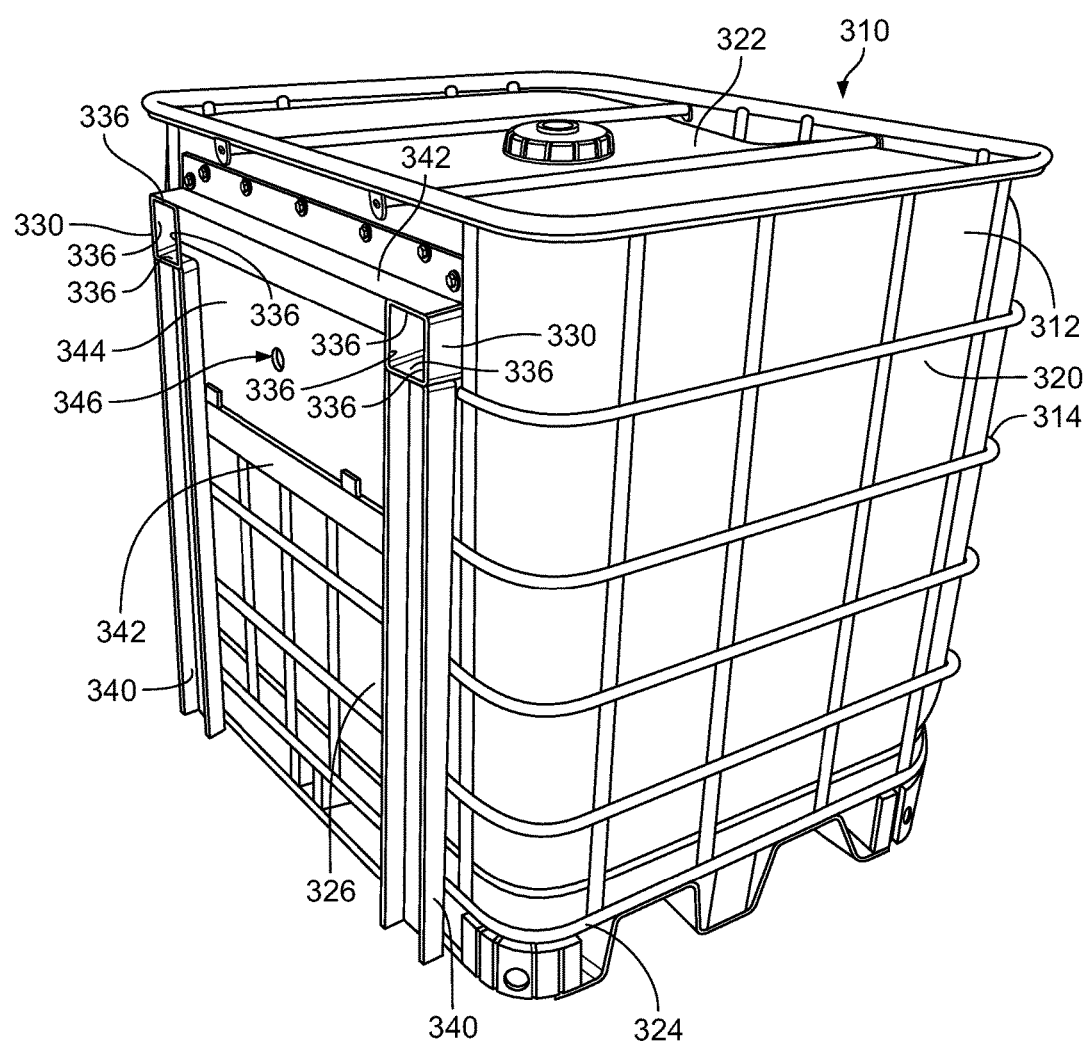
FIGS. 28-29 are a pair of drawing illustrating a salt tote of a fourth embodiment of the present disclosure viewed from a right perspective view and front elevation view, showing an opening enclosed by a door to selectively allow access to the enclosure.
Figure 29:
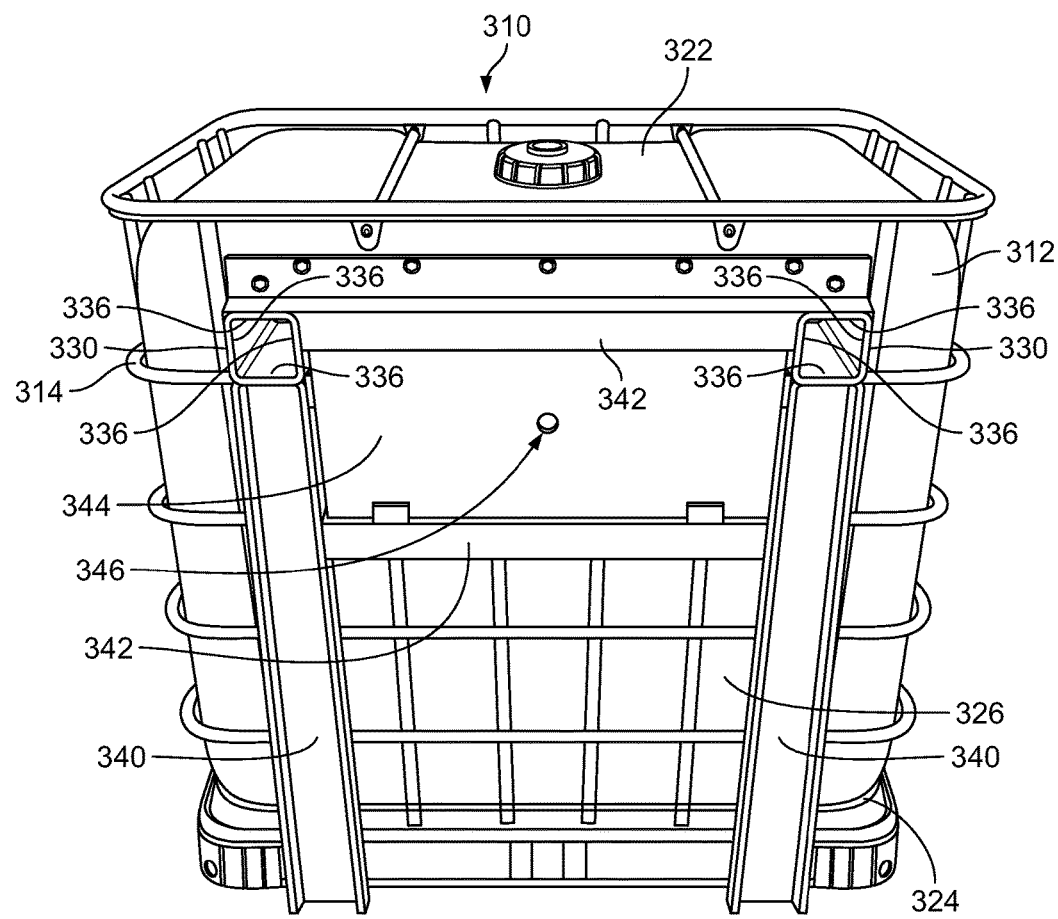
Figure 30:
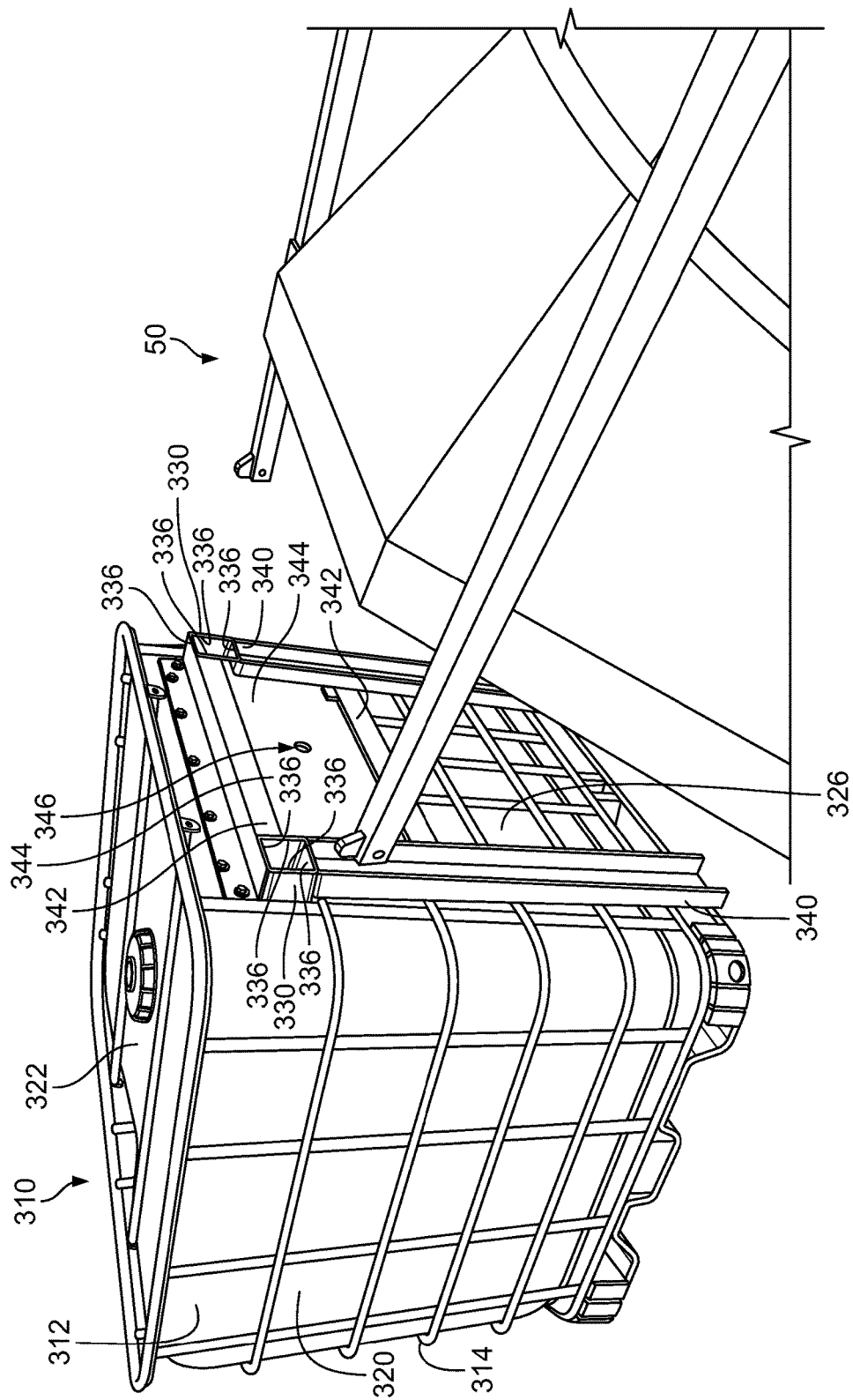
FIGS. 30-33 are a sequence of drawings showing the attachment of the salt tote of FIGS. 28-29 to a salt spreader device of a skid loader whereby the door is opened and the lift arms of the salt spreader device are inserted into the lifting rails of the salt tote until the opening of the salt tote mates with an opening of a hopper of the salt spreader device, and the lift arms are lifted to transfer the salt from the salt tote to the hopper.
Figure 31:
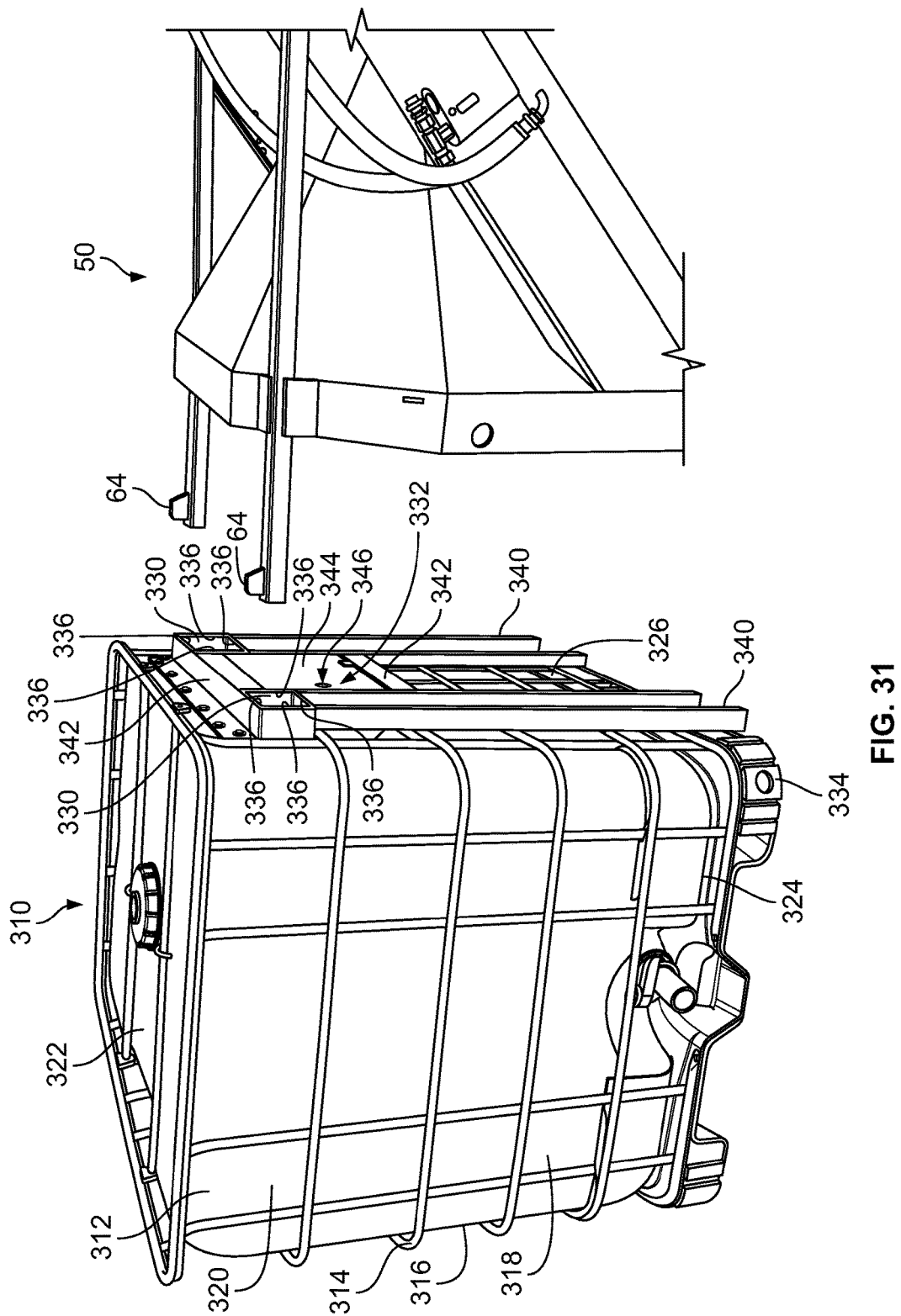
Figure 32:
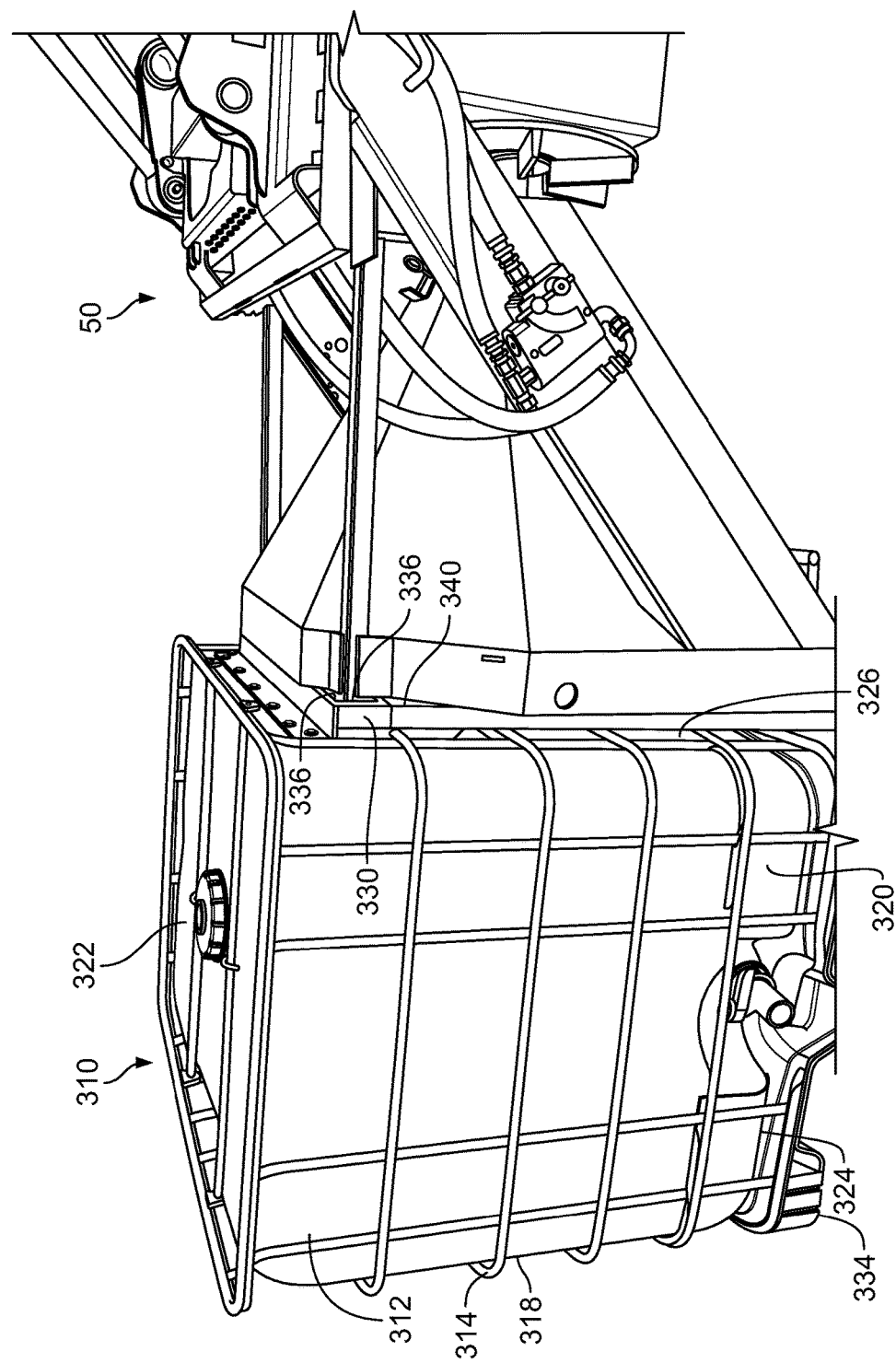
Figure 33:
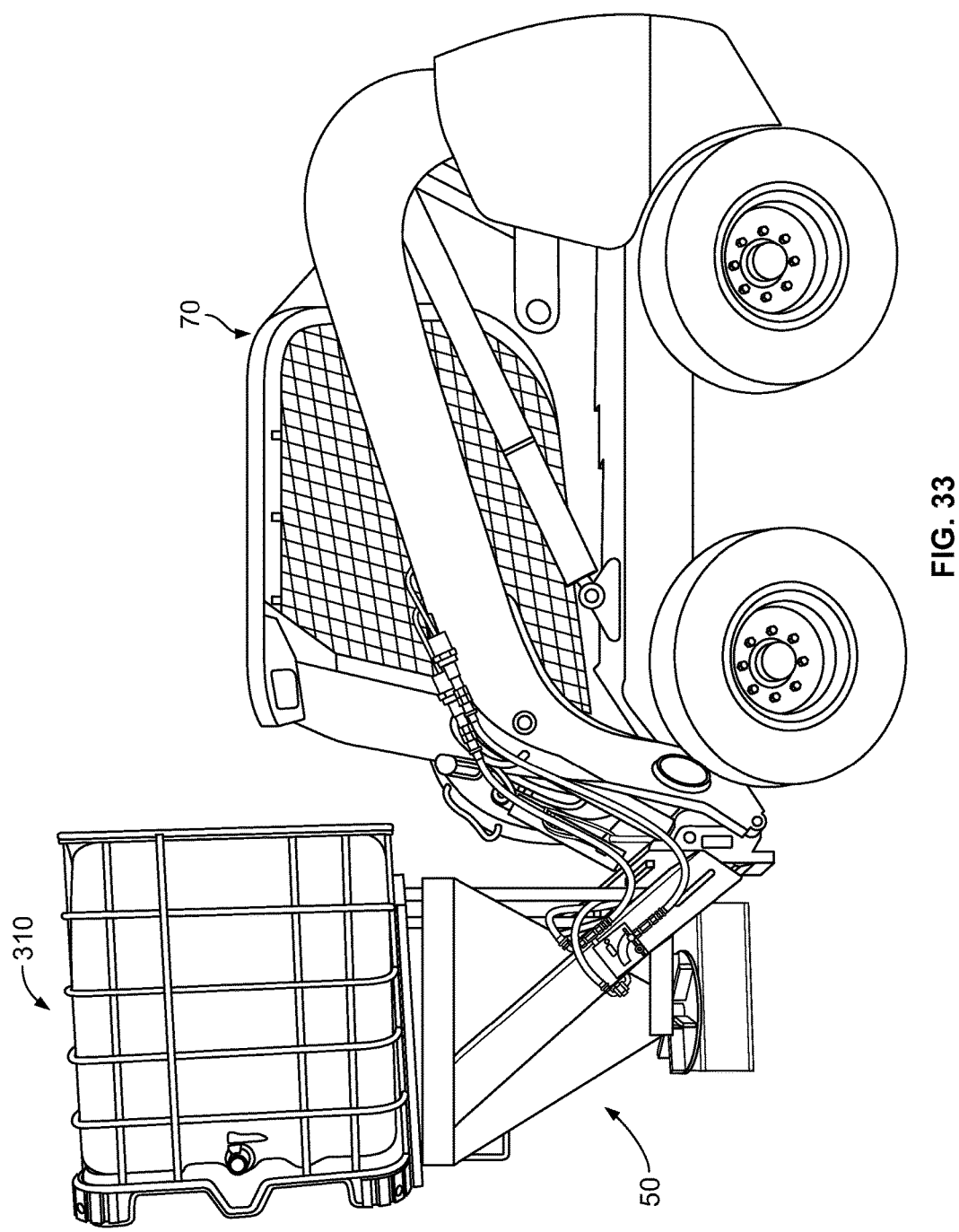

Referring to FIGS. 28-29, a salt tote 310 is shown in accordance with an alternative embodiment of the present disclosure. The salt tote 310 is similar to the salt tote 210 of the second embodiment except that the opening may include a door 344 having a doorknob hole 346. Elements of the salt tote 310 of this embodiment that correspond to the salt tote 210 of the third embodiment are designated by the same reference numeral, incremented by 100. A description of many of these elements is abbreviated or even eliminated in the interest of brevity. The salt tote 310 is constructed having an enclosure 312 supported by a durable frame 314. A front wall 326 of the enclosure 312 includes an opening 332. The opening may be enclosed by a door 344 having a doorknob hole 346 to allow the operator to open and close the door 344. The doorknob hole 346 may be replaced with a doorknob. The door 344 is closed when the salt tote 310 is storing salt. The door 344 is opened when it is desired to load salt into the enclosure 312, or to transfer salt to the salt spreader device 50. It is contemplated that the door 344 may take many constructions which serve the same function of selectively enclosing the opening 332.

Referring now to FIGS. 20-24, the salt tote 10 described above may be used in combination with a salt spreader device 50 according to one embodiment of the present disclosure. The salt spreader device 50 may be similarly used with all embodiments of the salt tote 10. The combination of a spreader device and a tote in accordance with principles of the present disclosure may be referred to as a material spreading system. The salt spreader device 50 may provide a spreader attachment 52 attached to a conventional skid loader 70 or any other suitable loading machine. The spreader attachment 52 may be attached to the skid loader 70 such that the spreader attachment 52 may be powered by the hydraulic system of the skid loader, as known in the art. The spreader attachment 52 includes a frame 53 rotatably attached to a boom 71 of the skid loader 70, a hopper 54 for containing grit, salt and/or any other material, a motor (not shown) for varying the flow of salt, a spinner wheel 56 (e.g., a spinner plate) or other discharge mechanism for distributing the salt to the ground, and a pair of lift arms 58 or rails for coupling the spreader attachment 52 to a salt tote 10.

Figure 21:
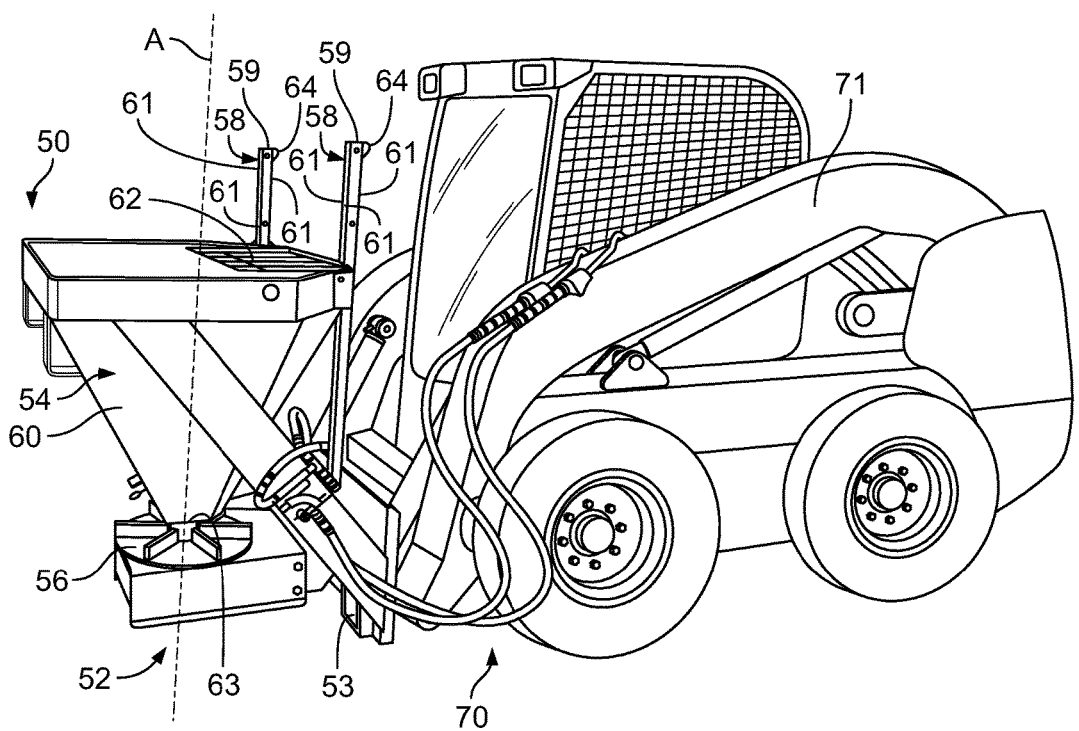
Figure 22:
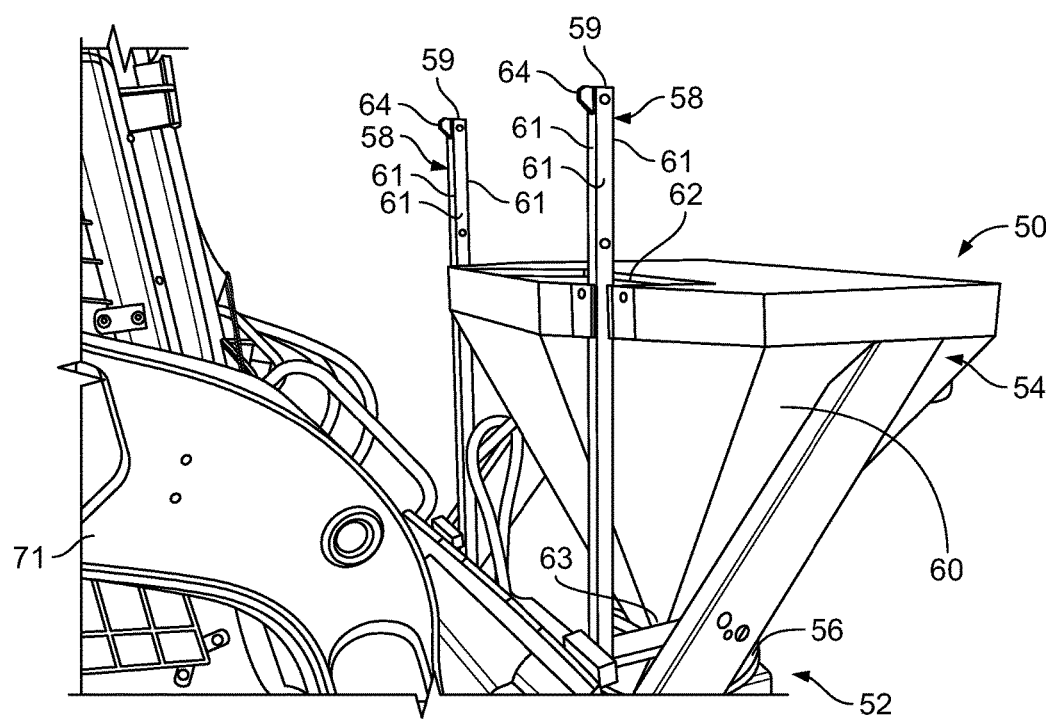
Figure 23:
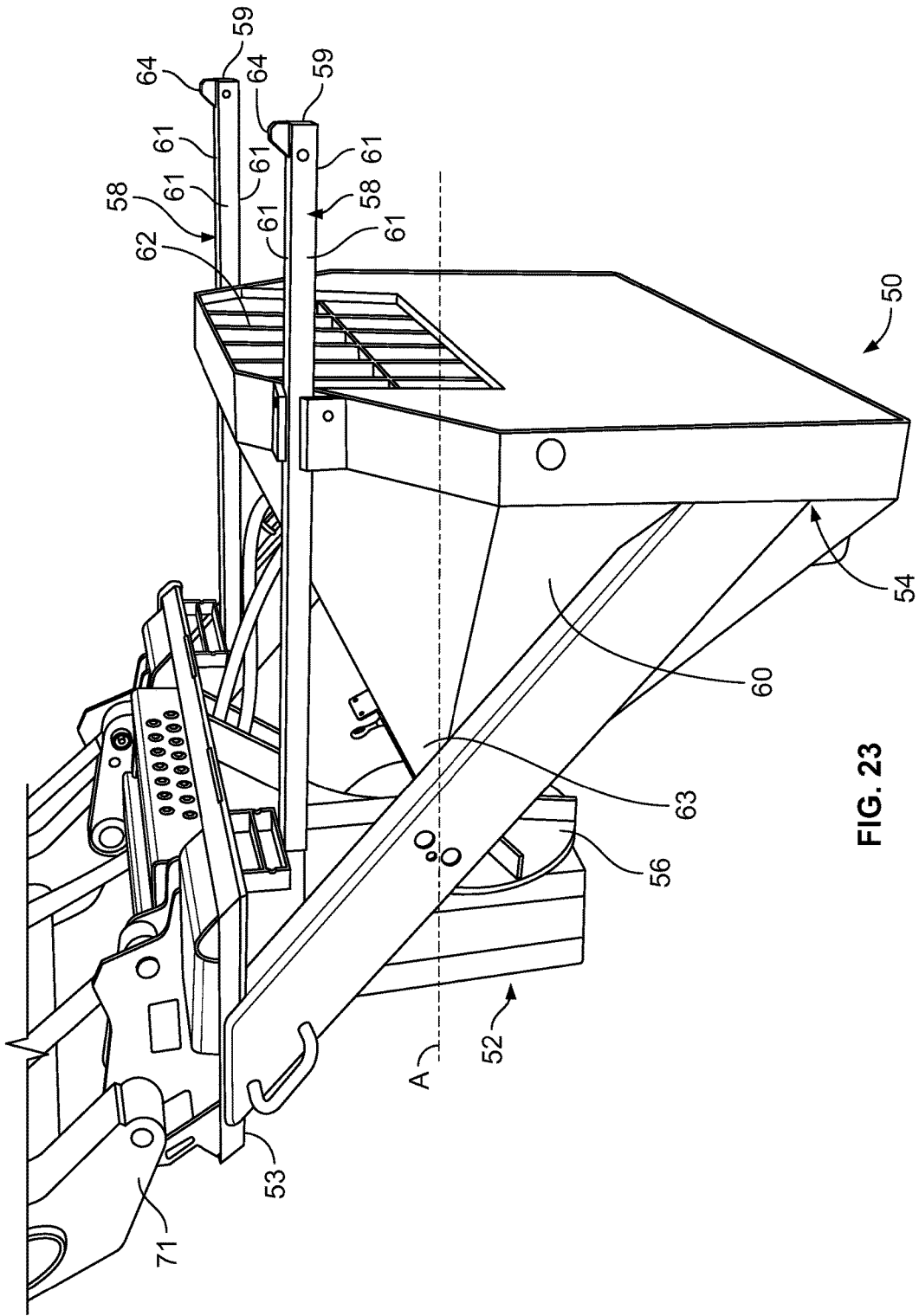
FIG. 23-24 are a pair of perspective views of the salt spreader device of FIGS. 20-22 where the salt spreader device is rotated downward so that the angle of the hopper opening is substantially vertical and the pair of lift arms extend substantially horizontally.
Figure 24:
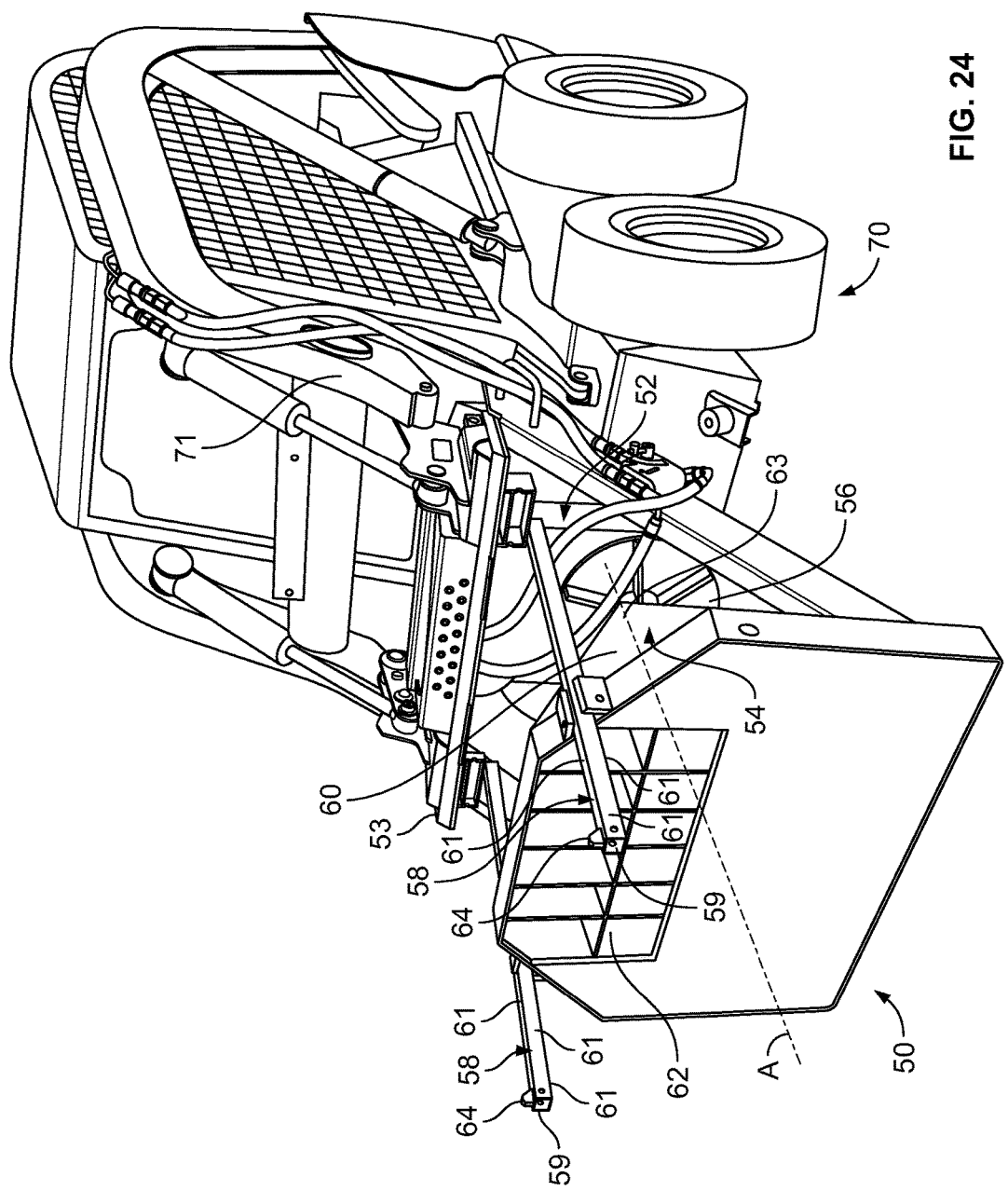
Figure 25:
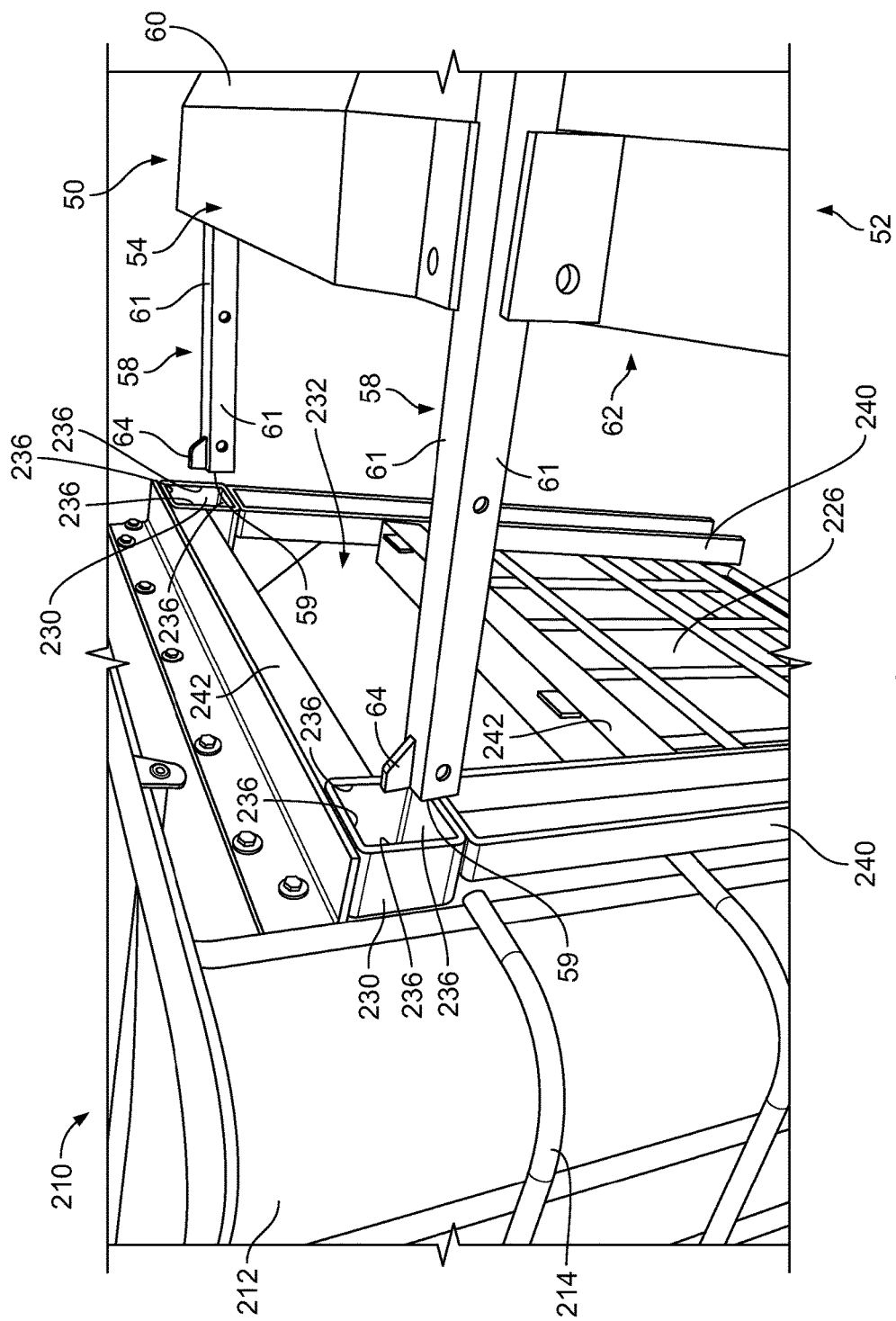
FIGS. 25-27 are a set of perspective views showing the attachment of the salt tote of FIGS. 17-19 to a salt spreader device of FIGS. 20-24 whereby the lift arms of the salt spreader device are inserted into the lifting rails of the salt tote and the opening of the hopper is aligned with the opening of the salt tote.
Figure 26:
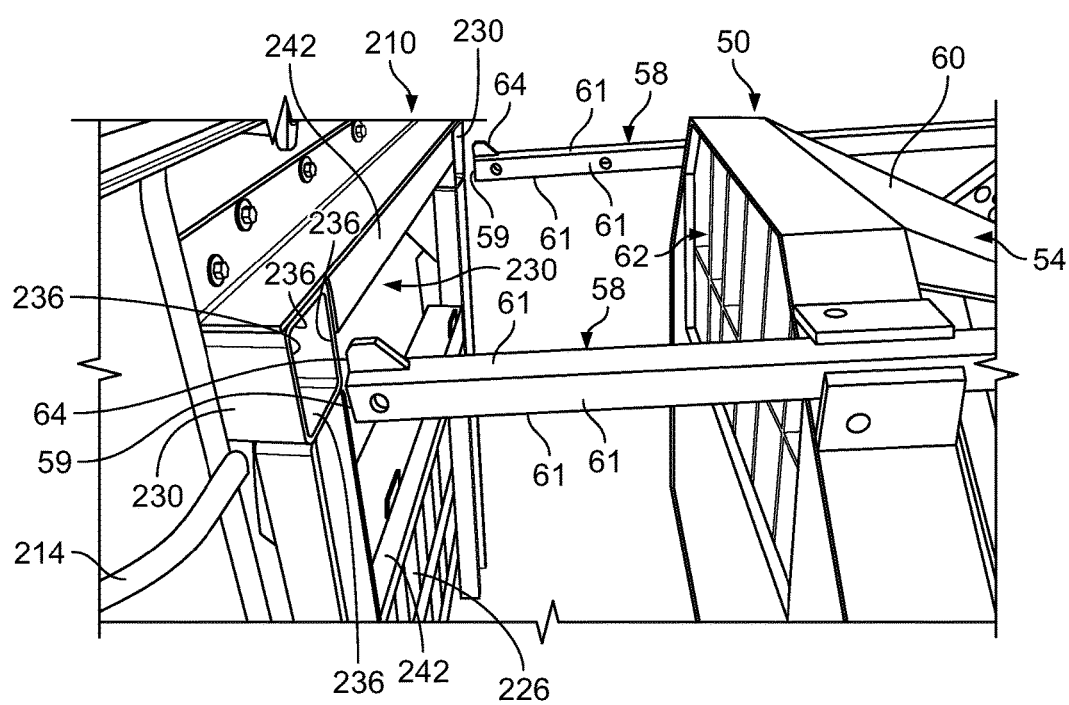
Figure 27:
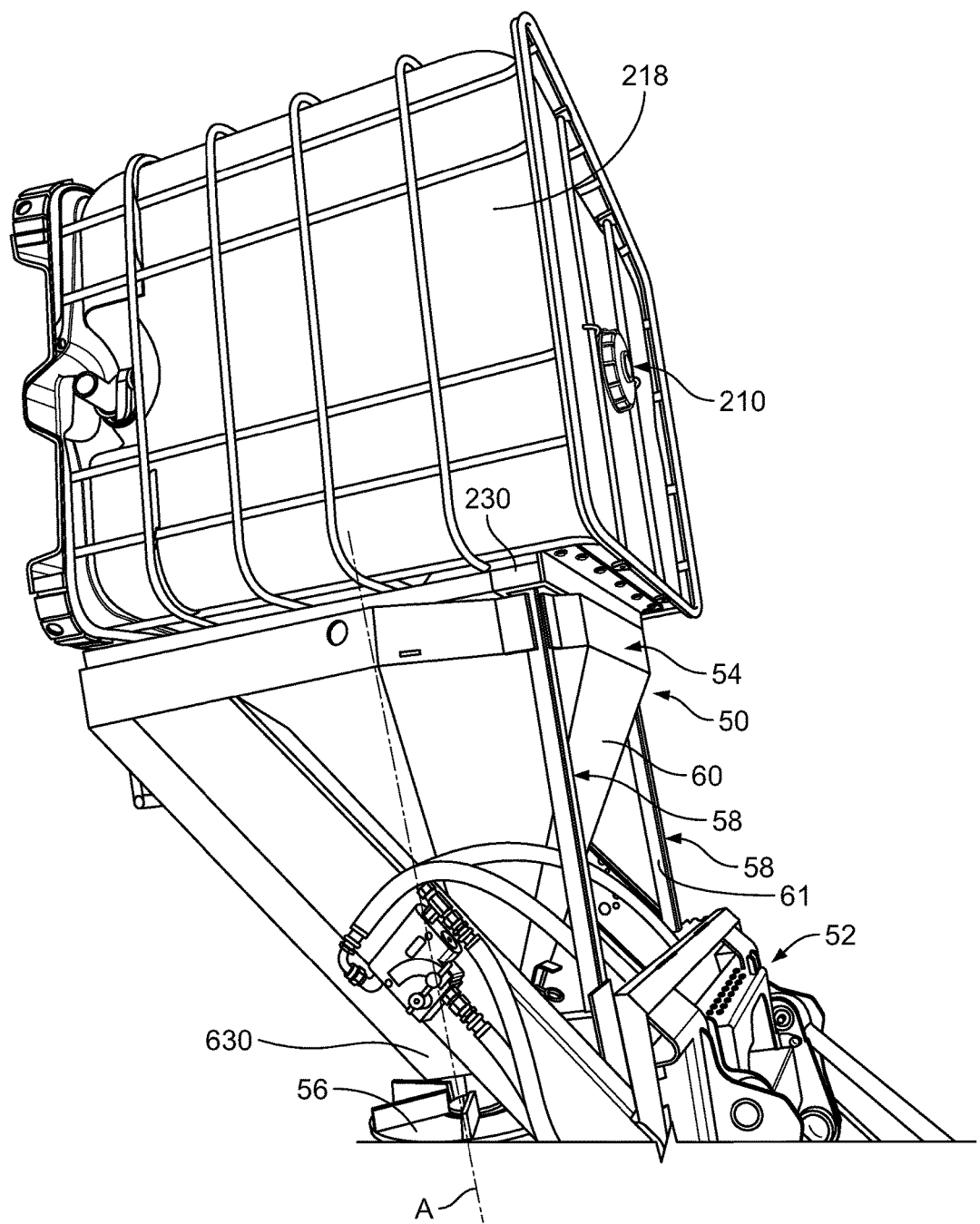

The hopper 54 provides a funnel-shaped volume 60 having an opening 62 or inlet, defined by a plane, for receiving contents into the volume 60. The opening 62 may be similarly sized to the opening 32 of the enclosure 12, however, it is understood that the opening 62 of the hopper 54 may be larger than the opening 32 of the enclosure 12. The volume 60 may hold a certain amount of salt before and during dispensing of salt. The hopper 54 may include an outlet 63 located at an opposite end of the hopper 54 as the opening 62. The outlet 63 may be aligned with a rotational axis A of the spinner wheel 56 such that the outlet 63 is configured to discharge the contents of the volume 60 to the spinner wheel 56 during operation. Due to its funnel-shaped volume 60, the hopper may have at least one sloped interior surface (hidden from view in the drawings) which directs the contents of the hopper 54 toward the outlet 63 when the hopper 54 has an upright configuration, as illustrated in FIGS. 21 and 22.

Each of the lift arms 58 may extend outward from the spreader attachment 52 in a direction away from the spinner wheel 56 and terminate at an exposed distal end 59. In some embodiments, each of the lift arms 58 may extend along a respective longitudinal axis that is parallel to the rotational axis A of the spinner wheel 56. Furthermore, each of the lift arms 58 may have one or more planar exterior surfaces 61 for interfacing with one or more of the planar interior surfaces 36 of the lifting rails 30. The distal ends of the pair of lift arms 58 may have teeth 64 or protrusions to help sustain the lift arms 58 within the lifting rails 30. For example, when the lift arms 58 are installed in the lifting rails 30, the lift arms 58 may extend through the lifting rails 30 so that the opposite end emerges outward from the lifting rails 30. In this respect, the length of the lift arms 58 is shorter than the lifting rails 30. The teeth 64 may protrude upward so that it catches on the upper lip of the lifting rails 30, preventing easy removal of the lift arms 58. Alternatively, the teeth 64 may fit within an opening formed within the lifting rails 30. It is understood that the pair of lift arms 58 may be positioned at different positions on the spreader attachment 52 to correspond with the location of the lifting rails 30 of the salt tote 10.

The spreader attachment 52 may be articulated by the skid loader 70 to pivot the spreader attachment 52 in a first downward position and a second upward position. In a first downward position (FIGS. 23-24), the hopper 54 is lowered such that the plane of the opening 62 is perpendicular to the ground and substantially vertical. In the first downward position, the pair of lift arms 58 extend forward and parallel to the ground. In a second upward position (FIGS. 20-22), the hopper 54 is upright such that the opening 62 is on a top end of the hopper 54 and the plane of the opening 62 is parallel to the ground. In the second upward position, the pair of lift arms 58 extend upward and perpendicular to the ground.

As seen in FIGS. 4-8, 11-16, 25-27, and 30-33 the salt tote 10 is coupled to the salt spreader device 50 in a similar manner for all embodiments of the salt tote 10. First, the operator of the skid loader 70 places the salt spreader device 50 into the first downward position. In this position, the pair of lift arms 58 extend forward toward the lifting rails 30 of the salt tote 10. It is understood that the pair of lift arms 58 are positioned on the spreader attachment 52 to align with the placement of the lifting rails 30. The operator then drives the skid loader 70 in a forward direction toward the salt tote 10 so that the lift arms 58 extend into the interior of the lifting rails 30. Once the lift arms 58 are fully inserted into the lifting rails 30, and the opening 62 of the hopper 54 meets the opening 32 of the salt tote 10, the operator pivots the lift arms 58 upward into the second upward position. In this respect, the salt tote 10 is lifted upward by the lift arms 58. Once the lift arms 58 extend upward and the salt tote 10 is rotated in a counterclockwise direction so that the opening 32 in the front wall 26 is facing downward, and therefore the salt from the salt tote 10 will fall into the hopper 54 by the force of gravity. The operator may assist in the transfer by jolting the lift arms 58 and allowing trapped salt to fall through the opening 32 of the salt tote 10 and into the opening 62 of the hopper 54. Once the desired amount of salt is transferred from the salt tote 10 to the hopper 54, the operator may rotate the salt tote 10 in a clockwise direction until the front wall 26 is orthogonal to the ground, and then lower the lift arms 58 downward to the first downward position. Once the salt tote 10 is returned to the ground, the operator may reverse the skid loader 70 to drive away from the salt tote 10 and remove the lift arms 58 from the lifting rails 30. Then, the operator may rotate the spreader attachment 52 in the counterclockwise direction until the rotational axis of the spinner wheel 56 is orthogonal to the ground and return the spreader attachment 52 to the second upward position to allow the salt spreader device 50 to dispense the loaded salt to the ground.

It is understood that the salt spreader device 50 may be a standalone device or be an attachment coupled to a pre-existing device as described above. Also, while the spreader attachment 52 is described as being attached to a skid loader 70, it is contemplated that the attachment may be coupled to another type of machine or device known in the art.

It is understood that the salt tote 10 may be pre-loaded with salt through the opening 32, or another opening provided in the enclosure 12. For example, the salt may be pre-loaded through a smaller hole, accepting inward flow of salt through a hose.

It is contemplated that the salt tote 10 may be pre-loaded with other materials besides granular material such as salt. For example, the tote 10 may hold any type of solid or liquid material desired to be stored within the enclosure 12 and loaded to a device for dispensing. For example, a liquid, such as a liquid de-icer, may be stored in the enclosure 12 and loaded into a spray bar or spray bar attachment of the skid loader 70 or another device. The spray bar attachment may be used in conjunction with the spreader attachment 52 for effective ice removal. The liquid may be transferred to the spray bar via a hose or by the articulation of the skid loader 70 described above.

Furthermore, the spreading systems and methods of the present disclosure are not limited to spreading de-icing materials. Rather, the spreading systems and methods of the present disclosure can be used in any application benefiting from the distribution of a material over a large surface area. For example, the spreading systems and methods of the present disclosure can be used in farming and/or landscaping operations to spread fertilizer, pesticides, water, or any other material.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present disclosure not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

LIST OF REFERENCE NUMERALS 10 salt tote
12 enclosure
14 frame
16 back sidewall
18 left sidewall
20 right sidewall
22 top wall
24 bottom wall
26 front wall
30 lifting rails
32 opening
34 base
36 planar interior surfaces
40 support bars
50 salt spreader device
52 spreader attachment
53 frame
54 hopper
56 spinner wheel
58 lift arms
59 distal ends of lift arms
60 volume
61 planar exterior surfaces
62 opening
63 outlet
64 teeth
70 skid loader
71 boom
110 salt tote
112 enclosure
114 frame
118 sidewall
120 sidewall
122 top wall
124 bottom wall
126 front wall
130 lifting rails
132 opening
134 lower base
136 planar interior surfaces
140 support bars
210 salt tote
212 enclosure
214 durable frame
218 sidewall
220 sidewall
222 top wall
224 bottom wall
226 front wall
230 lifting rails
232 opening
236 planar interior surface
240 support bars
242 guard rail
310 salt tote 312 enclosure
314 durable frame
318 sidewall
320 sidewall
322 top wall
324 bottom wall
326 front wall
330 lifting rails
336 planar interior surface
340 support bars
342 guard rail
344 door
346 doorknob hole
A rotational axis of the spinner wheel 56

What is claimed is:

1. A material spreading system comprising:
   a spreader including
      a frame attachable to a loading machine,
      an inlet for receiving a material,
      a discharge mechanism configured to selectively discharge the material onto the ground,
      a first spreader connector member, and
      the first spreader connector member and the inlet being rigidly mounted to the frame such that the first spreader connector member and the inlet are fixedly arranged relative to each other; and
   a tote selectively engageable with the spreader, the tote including
      a container having a plurality of walls enclosing an interior space for storing the material,
      a first tote connector member configured to matingly engage the first spreader connector member such that the first spreader connector member can lift the container, and
      an opening formed in one of the plurality of walls, wherein the opening aligns with the inlet of the spreader when the first spreader connector member matingly engages the first tote connector member, thereby permitting transfer of the material from the container to the discharge mechanism.

2. The material spreading system of claim 1, the plurality of walls comprising a bottom wall, a top wall, a rear wall, a front wall extending between the bottom wall and the top wall, a first sidewall extending between the front wall and the rear wall, and a second sidewall extending between the front wall and the rear wall, wherein the opening extends through the front wall.

3. The material spreading system of claim 2, the first tote connector member comprising a tubular member having a hollow interior dimensioned to receive the first spreader connector member.

4. The material spreading system of claim 3, the tubular member extending in a direction parallel to the bottom wall of the container.

5. The material spreading system of claim 2, the spreader comprising a second spreader connector member extending parallel to the first spreader connector member, and the tote comprising a second tote connector member configured to matingly engage the second spreader connector member.

6. The material spreading system of claim 5, the first tote connector member and the second tote connector member extending through the opening into the interior space of the container.

7. The material spreading system of claim 5, the first spreader connector member being mounted outwardly of the first sidewall and the second spreader connector member being mounted outwardly of the second sidewall such that the first and second spreader connectors members are disposed on opposite sides of the container.

8. The material spreading system of claim 2, the tote comprising a door covering the opening and selectively openable to provide access to the interior of the container.

9. The material spreading system of claim 2, the tote comprising a guard rail disposed along at least a portion of a rim defining the opening, the guard rail being constructed of a more rigid material than the container.

10. The material spreading system of claim 1, the discharge mechanism including a spinner plate configured to rotate about a rotational axis, and the first spreader connector member extends in a direction parallel to the rotational axis when the spreader is engaged with the tote.

11. The material spreading system of claim 1, the tote comprising a cage defined by a plurality of intersecting metal bars, the container being disposed within the cage.

12. The material spreading system of claim 11, the tote comprising a base plate connected to the cage, the container being enclosed on all sides by the base plate and the cage.

13. The material spreading system of claim 1, the first spreader connector member including a first lift arm extending in a direction away from the discharge mechanism, and the first tote connector member including a first receiving member configured to receive the first lift arm.

14. The material spreading system of claim 1, the material including a granular material.

15. A method of distribution of a material comprising:
   providing a quantity of the material;
   storing the quantity of the material in a plurality of totes at an application site;
   attaching a spreader device to a skid loader;
   driving the skid loader in a direction toward a first tote of the plurality of totes such that the spreader device interfaces with the first tote; and
   transferring the material from the first tote to the spreader device at the application site and distributing the material over the ground of the application site with the spreader device.

16. The method of claim 15, further comprising timing a purchase of the quantity of material for storing in the plurality of totes to be sufficiently in advance of a weather event producing at least one of snow or ice so that a market price paid for the quantity of material is lower than if the quantity of material were purchased at a time proximate to the weather event.

17. The method of claim 15, wherein transferring the material from the first tote to the spreader device comprises lifting the first tote off the ground with the spreader device and rotating the first tote and the spreader device such that the material falls from the first tote into the spreader device.

18. The method of claim 17, wherein the material is stored at the application site in the plurality of totes for at least 24 hours.

19. The method of claim 15, wherein the quantity of material in each of the totes is less than or equal to one cubic yard.

20. A tote for storing a material, the tote comprising:
   a container having an interior space enclosed by a bottom wall, a top wall, a front wall extending between the bottom wall and the top wall, a first sidewall extending between the front wall and the rear wall, and a second sidewall extending between the front wall and the rear wall;
   an opening extending through the front wall of the container and providing access to the interior space;

a first receiving member defining a first planar surface and configured to receive a first lifting arm, the first planar surface being disposed outside of the interior space of the container; and a second receiving member defining a second planar surface and configured to receive a second lifting arm, the second planer surface being disposed outside of the interior space of the container.

21. The tote of claim 20, the first and second planar surfaces each being parallel to the bottom wall of the container.

22. The tote of claim 21, the first receiving member including a first tubular member having a hollow interior defined in part by the first planar surface, the second receiving member including a second tubular member having a hollow interior defined in part by the second planar surface.

23. The tote of claim 22, the first and second tubular members each extending into the opening in the front wall of the container.

24. The tote of claim 22, the first tubular member being mounted outwardly of the first sidewall and the second tubular member being mounted outwardly of the second sidewall such that the first and second tubular members are disposed on opposite sides of the container.

25. The tote of claim 22, the first and second tubular members each have a rectangular-shaped cross section.

26. The tote of claim 20, comprising a door covering the opening and selectively openable to provide access to the interior of the container.

27. The tote of claim 20, comprising a guard rail disposed along at least a portion of a rim defining the opening, the guard rail being constructed of a more rigid material than the container.

28. The tote of claim 20, comprising:
a base plate positioned beneath the bottom wall of the container; and
a cage defined by a plurality of intersecting metal bars, the container being enclosed on all sides by the base plate and the cage.

29. The tote of claim 28, comprising:
a first support bar connected between the first receiving member and the base, and positioned outside the cage; and
a second support bar connected between the second receiving member and the base, and positioned outside the cage.

30. A spreader for a loading machine, the spreader comprising:
a frame attachable to the loading machine;
an inlet for receiving a material;
a discharge mechanism configured to selectively discharge the material onto the ground; and
a first lift arm extending in a first direction away from the discharge mechanism and terminating at a first exposed distal end, the first lift arm and the inlet being rigidly mounted to the frame such that the first lift arm and the inlet are fixedly arranged relative to each other.

31. The spreader of claim 30, the discharge mechanism including a spinner plate configured to rotate about a rotational axis, the rotational axis being parallel to the first direction.

32. The spreader of claim 31, the first exposed distal end of the first lift arm defining a leading edge of the spreader when the loading machine moves the spreader parallel to the first direction.

33. The spreader of claim 31, comprising a hopper having at least one sloping interior surface, a top end defining the inlet, and a bottom end defining an outlet for discharging the granular material to the spinner plate.

34. The spreader of claim 31, a second lift arm extending parallel to the first direction and terminating at a second exposed distal end.

35. The spreader of claim 34, the inlet being arranged between the first and second lift arms.

36. The spreader of claim 35, the first exposed distal end and the second exposed distal end including, respectively, a first protrusion and a second protrusion for releasably securing the spreader to a tote, wherein the first and second protrusions each extends in a direction orthogonal to the first direction.

37. The spreader of claim 31, the frame being rotatably attachable to a boom of the loading machine.

38. The spreader of claim 37, comprising a hydraulic actuator connected to the frame and configured to rotate the frame relative to the boom of the loading machine.

39. A spreading method for a material stored in a tote, the spreading method comprising:
attaching a spreader to a loading machine;
aligning an inlet of the spreader with an opening in a front wall of the tote;
driving the loading machine in a forward direction toward the front wall of the tote such that a lift arm of the spreader matingly engages a receiving member of the tote;
using the loading machine to rotate the tote to a position in which the tote is positioned above the inlet of the spreader, such that the material falls through the opening in the front wall of the tote and into the inlet of the spreader; and
operating a spinner plate of the spreader to discharge the material onto the ground by rotating the spinner plate about a rotational axis parallel to a longitudinal axis of the lift arm.

40. The spreading method of claim 39, prior to operating the spinner plate to spread the material onto the ground, using the loading machine to:
rotate the tote back to a position in which the front wall of the tote is orthogonal to the ground,
lower the tote to the ground,
disengage the spreader from the tote by moving the loading machine in a reverse direction, and
rotate the spreader to a position in which a rotational axis of the spinner plate is orthogonal to the ground.

41. The spreading method of claim 40, wherein driving the loading machine in the forward direction toward the front wall of the tote such that the lift arm of the spreader matingly engages the receiving member of the tote comprises inserting the lift arm into a tubular member of the receiving member.

42. The spreading method of claim 41, wherein the tubular member extends through the opening in the front wall of tote.

43. The spreading method of claim 41, wherein the tubular member is mounted outwardly of a sidewall of the tote.

44. The spreading method of claim 39, prior to operating the spinner plate to spread the material over the ground, storing the tote, with the material contained inside the tote, at an application site where the material is to be spread onto the ground.

45. The spreading method of claim 39, wherein driving the loading machine in the forward direction toward the front wall of the tote such that the lift arm of the spreader matingly engages the receiving member of the tote comprises engaging the receiving member with a protrusion extending upwardly from a distal end of the lift arm after inserting the lift arm into the receiving member.

46. The spreading method of claim 39, the material including a granular material.

47. A material spreading system comprising:
a spreader including
a frame attachable to a loading machine,
an inlet for receiving a material,
a discharge mechanism configured to selectively discharge the material onto the ground, and
a first spreader connector member; and
a tote selectively engageable with the spreader, the tote including
a container having a plurality of walls enclosing an interior space for storing the material, the plurality of walls including a bottom wall, a top wall, a rear wall, a front wall extending between the bottom wall and the top wall, a first sidewall extending between the front wall and the rear wall, and a second sidewall extending between the front wall and the rear wall,
a first tote connector member configured to matingly engage the first spreader connector member such that the first spreader connector member can lift the container,
an opening formed in the front wall, wherein the opening aligns with the inlet of the spreader when the first spreader connector member matingly engages the first tote connector member, thereby permitting transfer of the material from the container to the discharge mechanism, and
a guard rail disposed along at least a portion of a rim defining the opening, the guard rail being constructed of a more rigid material than the container.

48. A material spreading system comprising:
a spreader including
a frame attachable to a loading machine,
an inlet for receiving a material,
a discharge mechanism configured to selectively discharge the material onto the ground, and
a first spreader connector member; and
a tote selectively engageable with the spreader, the tote including
a container having a plurality of walls enclosing an interior space for storing the material,
a first tote connector member configured to matingly engage the first spreader connector member such that the first spreader connector member can lift the container,
an opening formed in one of the plurality of walls, wherein the opening aligns with the inlet of the spreader when the first spreader connector member matingly engages the first tote connector member, thereby permitting transfer of the material from the container to the discharge mechanism, and
a cage defined by a plurality of intersecting metal bars, the container being disposed within the cage.

49. A tote for storing a material, the tote comprising:
a container having an interior space enclosed by a bottom wall, a top wall, a front wall extending between the bottom wall and the top wall, a first sidewall extending between the front wall and the rear wall, and a second sidewall extending between the front wall and the rear wall;
an opening extending through the front wall of the container and providing access to the interior space;
a first receiving member defining a first planar surface and configured to receive a first lifting arm;
a second receiving member defining a second planar surface and configured to receive a second lifting arm; and
a guard rail disposed along at least a portion of a rim defining the opening, the guard rail being constructed of a more rigid material than the container.

50. A tote for storing a material, the tote comprising:
a container having an interior space enclosed by a bottom wall, a top wall, a front wall extending between the bottom wall and the top wall, a first sidewall extending between the front wall and the rear wall, and a second sidewall extending between the front wall and the rear wall;
an opening extending through the front wall of the container and providing access to the interior space;
a first receiving member defining a first planar surface and configured to receive a first lifting arm;
a second receiving member defining a second planar surface and configured to receive a second lifting arm;
a base plate positioned beneath the bottom wall of the container; and
a cage defined by a plurality of intersecting metal bars, the container being enclosed on all sides by the base plate and the cage.

51. A spreader for a loading machine, the spreader comprising:
a frame attachable to the loading machine;
an inlet for receiving a material;
a discharge mechanism configured to selectively discharge the material onto the ground;
a first lift arm extending in a first direction away from the discharge mechanism and terminating at a first exposed distal end, the first exposed distal end of the first lift arm defining a leading edge of the spreader when the loading machine moves the spreader parallel to the first direction;
a second lift arm extending parallel to the first direction and terminating at a second exposed distal end, the inlet being arranged between the first and second lift arms;
the discharge mechanism including a spinner plate configured to rotate about a rotational axis, the rotational axis being parallel to the first direction; and
the first exposed distal end and the second exposed distal end including, respectively, a first protrusion and a second protrusion for releasably securing the spreader to a tote, wherein the first and second protrusions each extends in a direction orthogonal to the first direction.

52. A spreading method for a material stored in a tote, the spreading method comprising:
attaching a spreader to a loading machine;
aligning an inlet of the spreader with an opening in a front wall of the tote;
driving the loading machine in a forward direction toward the front wall of the tote such that a lift arm of the spreader matingly engages a receiving member of the tote;
using the loading machine to
rotate the tote to a position in which the tote is positioned above the inlet of the spreader, such that the material falls through the opening in the front wall of the tote and into the inlet of the spreader,
rotate the tote back to a position in which the front wall of the tote is orthogonal to the ground, lower the tote to the ground,
  disengage the spreader from the tote by moving the loading machine in a reverse direction, and
  rotate the spreader to a position in which a rotational axis of a spinner plate of the spreader is orthogonal to the ground; and
operating the spinner plate to discharge the material onto the ground.

53. A spreading method comprising:
storing a tote, with a material contained inside the tote, at an application site where the material is to be spread onto the ground;
attaching a spreader to a loading machine;
aligning an inlet of the spreader with an opening in a front wall of the tote;
driving the loading machine in a forward direction toward the front wall of the tote such that a lift arm of the spreader matingly engages a receiving member of the tote;
using the loading machine to rotate the tote to a position in which the tote is positioned above the inlet of the spreader, such that the material falls through the opening in the front wall of the tote and into the inlet of the spreader; and
operating a spinner plate of the spreader to discharge the material onto the ground.

* * * * *